(12) United States Patent
Lee et al.

(10) Patent No.: US 8,549,085 B2
(45) Date of Patent: *Oct. 1, 2013

(54) CONDITIONAL COMMUNICATION

(75) Inventors: Michael Lee, San Jose, CA (US); Henri Lamiraux, San Carlos, CA (US); Christopher Ryan, Windam, NH (US); Scott Forstall, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 336 days.

This patent is subject to a terminal disclaimer.

(21) Appl. No.: 12/961,849

(22) Filed: Dec. 7, 2010

(65) Prior Publication Data

US 2011/0078267 A1  Mar. 31, 2011

Related U.S. Application Data

(63) Continuation of application No. 12/005,677, filed on Dec. 28, 2007, now Pat. No. 7,860,935.

(51) Int. Cl.
*G06F 15/16* (2006.01)

(52) U.S. Cl.
USPC .......................................... 709/206; 709/229

(58) Field of Classification Search
None
See application file for complete search history.

(56) References Cited

U.S. PATENT DOCUMENTS

| 6,108,688 | A  | * | 8/2000 | Nielsen | 709/206 |
| 7,272,382 | B2 |   | 9/2007 | Servi et al. | |
| 7,305,441 | B2 | * | 12/2007 | Mathewson et al. | 709/206 |
| 2006/0218232 | A1 | * | 9/2006 | Kubala et al. | 709/206 |

* cited by examiner

*Primary Examiner* — Peling Shaw
(74) *Attorney, Agent, or Firm* — Meyertons, Hood, Kivlin, Kowert & Goetzel, P.C.

(57) ABSTRACT

Conditional communication settings may be defined by a user of a communications device to be transmitted with a communication to a receiving device, where the receiving device may be restricted from performing a user-specified type of communication operations with a user-specified contact until the conditional communication settings are satisfied. The conditional communication settings may include a condition value setting, which may be a task to be performed by a recipient, a date and/or time, a location, an operation to be performed by a third party contact, or other suitable criterion. The receiving device may detect whether such condition value setting has been satisfied. Unless the condition value setting has been satisfied, the receiving device may be prevented from performing the user-specified type of communication operation with the user-specified contact.

22 Claims, 18 Drawing Sheets

| Condition Type 1102 | Condition Value 1104 | Default 1106 | Target Contact 1108 | Blocked Communication 1110 | Terminate Condition Date/Time? 1112 | Notification? 1114 | Condition Status 1116 |
|---|---|---|---|---|---|---|---|
| Task | Email; Open Attachment | Yes | Alex | Email | None | Yes | Not Satisfied |
| Date/Time | Monday, August 27, 3:00 pm EST | No | Brett | Call, Email, Text, Instant Message | Autodelete | Yes | Not Satisfied |
| Location | Home | No | Carrie | Call | Tuesday, August 28, 8:00 am EST | Yes | August 25, 10:33 pm EST |
| Performance by another Contact | Contact to Perform Operation: Evan  Operation: Reply by Email | No | David | Email | None | No | N/A |
| Other Criterion | Finish Report | No | Fred | Call | None | Yes | Not Satisfied |

| Condition Type | Condition Value | Default | Blocked Communication | Blocked Contact | Terminate Condition Date/Time? | Notification? | Condition Status |
|---|---|---|---|---|---|---|---|
| Task | Email; Open Attachment | Yes | Send Email | George | None | Yes | Not Satisfied |
| Date/Time | August 24, 8:30 pm EST | No | Call, text message | Harry | Autodelete | Yes | August 24, 8:30 pm EST |

CONDITIONAL COMMUNICATION

CROSS-REFERENCE TO RELATED APPLICATION

This application is a continuation of copending, commonly-assigned U.S. patent application Ser. No. 12/005,677, filed Dec. 28, 2007, which is fully incorporated by reference herein in its entirety.

BACKGROUND OF THE INVENTION

This relates generally to communications devices, and, more particularly, to communications devices that support transmitting and receiving a communication with conditional communication settings, where the recipient of the communication with conditional communication settings will be restricted from performing select types of communications operations with select individuals until the conditional communication settings are satisfied.

There are an increasing number of modes of communication by which individuals may send and receive correspondence or messages. Individuals may send and receive audio messages, such as voice messages, or data messages, such as emails, text messages, or instant messages. Many modes of communication and messaging may be incorporated into a single communications device.

As individuals assume more responsibilities, they may often forget to read or listen to all correspondence or messages they receive. They may also forget to perform various tasks, meet appointments or meet other obligations. In some instances, it may be beneficial for individuals to read or listen to their messages, or perform their various tasks, meet their appointments or meet their other obligations prior to performing a communications operation with other individuals. Their failure to read or listen to their messages, or perform their various tasks, meet their appointments or meet their other obligations prior to performing a communications operation with other individuals may result in negative consequences, such as wasted time, or unnecessary duplication of efforts in communicating a message.

For example, an individual may receive an email communication from a sender containing a set of instructions for an assignment. However, the individual may forget to open the email communication, or he might not be aware he has received such an email communication. The individual might perform a communications operation of his own with the initial sender to inquire about the assignment, in spite of not having opened and read the sender's email communication containing the set of instructions. Such a situation may result in confusion between the parties because the individual did not read the most recent information concerning the assignment. It also may result in wasted time and duplication of efforts for both parties, because the initial sender may have to re-explain the instructions contained in his email communication, or the individual's communications operation may have been unnecessary.

SUMMARY OF THE INVENTION

To avoid such a problem, embodiments of the present invention describe systems, methods and devices in which a user (or sender) of a communications device may set and transmit a communication with conditional communication settings, where a recipient of the communication with conditional communication settings is restricted from performing certain types of communications operation until the conditional communication settings have been satisfied.

The recipient's communications device may automatically detect when such conditions have been met or performed, and thereafter, the recipient of the communications operation with conditional communication settings may be permitted or authorized to perform the formerly-restricted communications operation without restriction. In some embodiments, the recipient may manually indicate that the conditions set by the user (or sender) have been satisfied, and thereafter may perform the formerly-restricted communications operations without restriction.

The communications device may be any device suitable for transmitting a communication (e.g., voice or data) as part of a communications operation, and is compatible with setting conditional communication settings. The communications operation may include audio communications (e.g., telephone), video communications (e.g., video conferencing), data communications (e.g., email, instant messaging, text messaging), or any combination thereof. The communication may be sent via any suitable means for transmitting audio, video, or data (e.g., via a wired telephone line or via cable line, or via a wireless network).

The communications device can be programmed by a sender using any suitable criteria. In one embodiment, the sender may set a condition on a recipient of a communication based on a task to be performed by the recipient. For example, the sender may require the recipient to open a certain email before the recipient can respond to the sender's communication. Other examples of conditions based on tasks to be performed by the recipient may include opening an attachment, opening the most recent email in an email string, checking voicemail, initiating a communication operation with a third party, or completing a user-defined task list. In other embodiments, conditions may be based on the expiration of a date/time, the physical or geographic location of the recipient, the performance of a task by a third party, or any other criteria defined by the sender.

BRIEF DESCRIPTION OF THE DRAWINGS

The above and other advantages of the present invention will be apparent upon consideration of the following detailed description, taken in conjunction with accompanying drawings, in which like reference characters refer to like parts throughout, and in which:

FIG. 11 is an illustrative data structure listing a number of conditional communication settings stored in a transmitting device in accordance with one embodiment of the present invention;

FIG. 13 is an illustrative data structure listing a number of conditional communication settings stored in a receiving device in accordance with one embodiment of the present invention;

DETAILED DESCRIPTION OF THE INVENTION

Figure 1:
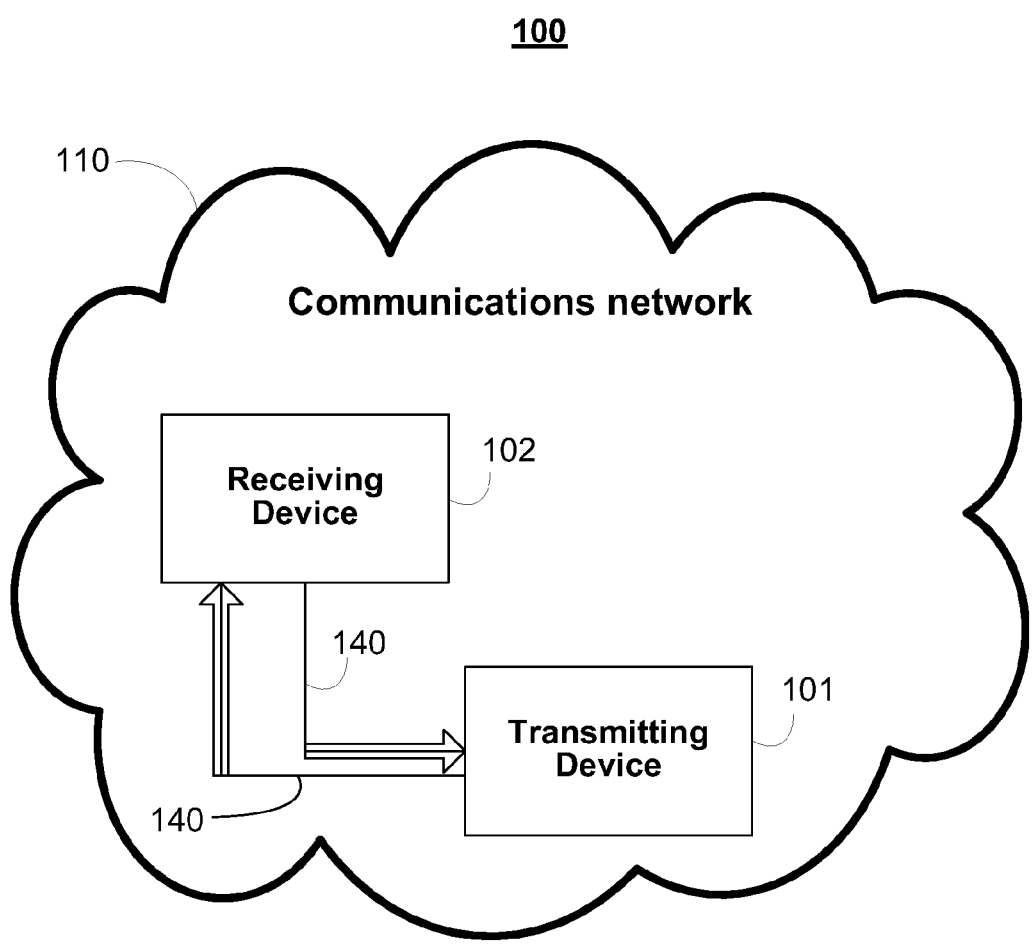
FIG. 1 is an illustrative schematic view of a communications system in accordance with one embodiment of the present invention.

The methods, systems and devices of the present invention may be applied to a communications system and communications device or devices described herein. FIG. 1 shows an illustrative schematic view of a communications system that may be compatible with a sender setting and performing a conditional communications operation with a recipient, where the recipient is restricted from performing a reply communications operation until the conditional communication settings have been satisfied, in accordance with one embodiment of the invention. Communications system 100 may include a communications device that transmits an outgoing communication (e.g., transmitting device 101) and communications network 110, which transmitting device 101 may use to initiate and conduct communications operations with other communications devices within communications network 110. Communications system 100 may include a communications device that receives the outgoing communication from the transmitting device (e.g., receiving device 102). Although communications system 100 may include several transmitting devices 101 and receiving devices 102, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., a 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, communications network 110 may support protocols used by wireless and cellular phones and personal email devices (e.g., a Blackberry®). Such protocols can include, for example, GSM, GSM plus EDGE, CDMA, quad-band, and other cellular protocols. In another example, a long range communications protocol can include Wi-Fi and protocols for placing or receiving calls using VOIP or LAN. Transmitting device 101 and receiving device 102, when located within communications network 110, may communicate over a bidirectional communication path such as path 140. Both transmitting device 101 and receiving device 102 may be capable of transmitting a communication and receiving a transmitted communication.

Transmitting device 101 and receiving device 102 may include any suitable device for transmitting and receiving communications. For example, transmitting device 101 and receiving device 102 may include a media player such as an iPod Touch available from Apple Inc., of Cupertino, Calif., a cellular telephone or a landline telephone, a personal email or messaging device (e.g., a Blackberry® or a Sidekick®), an iPhone available from Apple Inc., pocket-sized personal computers such as an iPAQ Pocket PC available by Hewlett Packard Inc., of Palo Alto, Calif., personal digital assistants (PDAs), a desktop computer, a laptop computer, and any other device capable of communicating wirelessly (with or without the aid of a wireless enabling accessory system) or via wired pathways (e.g., using traditional telephone wires). The communications transmitted and received may include any suitable form of communication, including for example, voice communications (e.g., telephone calls), video communications (e.g., video conferencing), data communications (e.g., emails, text messages, media messages), or combinations of these.

A communication may be transmitted directly from the transmitting device 101 to the receiving device 102 via the bidirectional communication path 140 of communications network 110. In some embodiments, a communication may be transmitted from the transmitting device to a remote server (not shown) within communications network 110. The remote server may then transmit the communication to receiving device 102.

Figure 2:
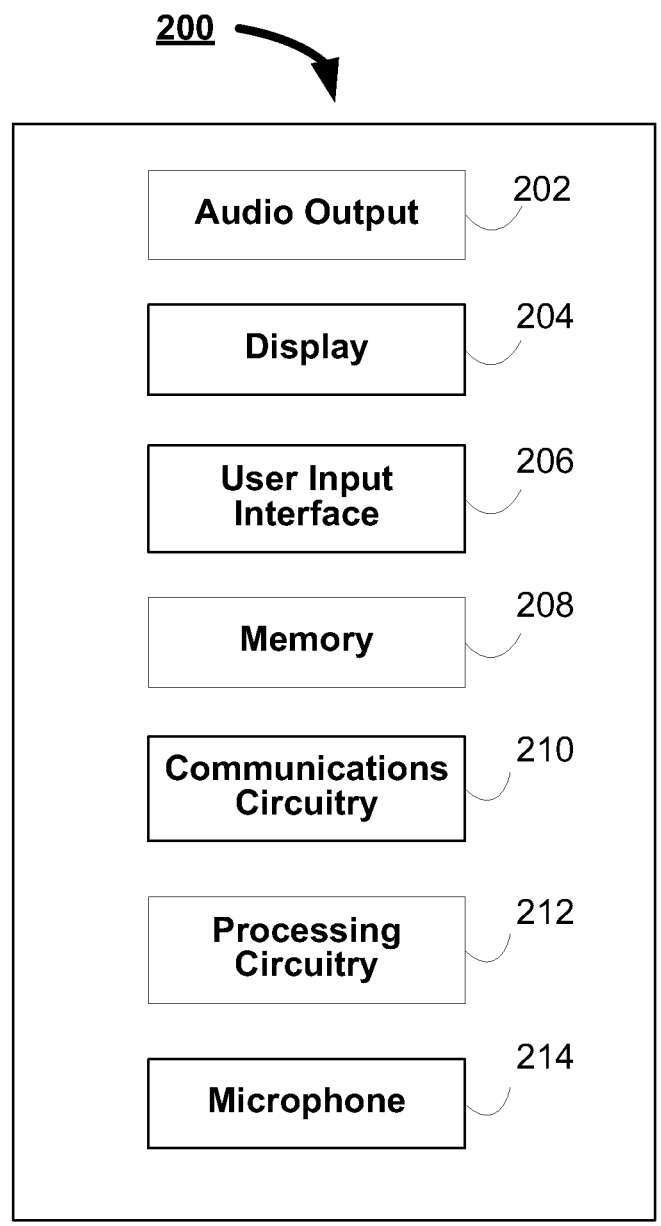
FIG. 2 is an illustrative block diagram of a communications device in accordance with one embodiment of the present invention.

FIG. 2 shows a simplified block diagram of a communications device 200 that may be compatible with a sender setting and transmitting a conditional communication to a recipient, where the recipient is restricted from performing a reply communications operation until the conditional communication settings have been satisfied, in accordance with one embodiment of the invention. Both transmitting device 101 and receiving device 102 may include some or all of the features of communications device 200. Communications device 200 may include audio output 202, display 204, user input interface 206, memory 208, communications circuitry 210, processing circuitry 212, microphone 214, and any other suitable components. Processing circuitry 212 may communicate with the other components of the communications device 200. In some embodiments, processing circuitry 212 may execute instructions stored in memory 208. Processing circuitry 212 may also be operative to control the performance of communications device 200. Processing circuitry 212 may include, for example, a processor, a microcontroller, and/or a bus (e.g., for sending instructions to the other components of communications device 200). In some embodiments, processing circuitry 212 may also drive the display and process inputs received from the user input interface 206. Processing circuitry 212 may also include graphics circuitry (e.g., a video card with 2D, 3D, or vector graphics capabilities). Also, in some embodiments, where communications device 200 is capable of sending and receiving different types of communications (e.g., voice communications, such as telephone calls, video communications, such as video conferencing, and data communications, such as emails, text messages and media messages), processing circuitry 212 may operate to communicate between the different applications used to perform the different types of communications operations.

With continuing reference to FIG. 2, memory 208 may include one or more different types of memory that can be used to perform device functions. For example, memory 208 may include cache, flash memory, ROM, RAM, and/or hybrid types of memory. Memory 208 may also store firmware for the device and its applications (e.g., operative system, user interface functions, and processor functions).

Communications device 200 may also include user input interface 206, audio output 202 and display 204 for providing a user with the ability to interact with communications device 200. For example, user input interface 206, audio output 202, and display 204 may provide an interface for a user to interact with an application running on processing circuitry 212. User input interface 206 may take a variety of forms, such as a keyboard/keypad, trackpad, mouse, click wheel, button, stylus, or touch screen. User input interface 206 may also include one or more devices for user authentication (e.g., smart card reader, fingerprint reader, or iris scanner), as well as an audio input device (e.g., a microphone) or a video input device (e.g., a camera or web cam) for recording video or still frames.

Audio output 202 may include any suitable audio component for providing audio to the user of communications device 200. For example, audio output 202 may include one or more speakers (e.g., mono or stereo speakers) built into communications device 200. In some embodiments, audio output 202 may include an audio component that is remotely coupled to communications device 200. For example, audio output 202 may include a headset, headphones or earbuds that may be coupled to communications device with a wire (e.g., coupled to communications device 200 with a jack) or wirelessly (e.g., Bluetooth® headphones or a Bluetooth® headset).

Display 204 may include a liquid crystal display (LCD), a touch screen display, or any other suitable system for presenting information or media to a user. Display 204 may be controlled by graphics circuitry, which may be included in processing circuitry 212.

Communications circuitry 210 may be any suitable communications circuitry operative to connect communications device 200 to a communications network (e.g., communications network 110, FIG. 1) and to transmit communications (e.g., audio, video and/or data communications) from communications device 200 to other devices within the communications network. Communications circuitry 210 may be operative to interface with the communications network using any suitable communications protocol such as, for example, Wi-Fi (e.g., a 802.11 protocol), Bluetooth (registered trademark), high frequency systems (e.g., 900 MHz, 2.4 GHz, and 5.6 GHz communication systems), infrared, GSM, GSM plus EDGE, CDMA, quadband, and other cellular protocols, VOIP, or any other suitable protocol.

In some embodiments, communications circuitry 210 may be operative to create a communications network using any suitable communications protocol. For example, communications circuitry 210 may create a short-range communications network using a short-range communications protocol to connect to other devices. For example, communications circuitry 210 may be operative to create a local communications network using the Bluetooth® protocol to couple communications device 210 with a Bluetooth® headset. Communications circuitry 210 may also include a wired or wireless network interface card (NIC) configured to connect to the Internet or any other public or private network.

In some embodiments, communications device 200 may contain more than one set of communications circuitry 210 in order to connect communications device 200 to more than one type of communications network (e.g., communications network 110, FIG. 1) and to perform more than one type of communications operation (e.g., audio, video and/or data communications) from communications device 200 to other devices within the communications network. Processing circuitry 212 may operate to communicate between the different sets of communications circuitry 210 used to perform the different types of communications operations. Alternatively, communications device 200 may include more than one communications device, where each communications device contains its own communications circuitry 210 in order to connect to different types of communications networks (e.g., communications network 110, FIG. 1) and to perform different types of communications operation (e.g., audio, video and/or data communications). Processing circuitry 212 of communications device 200 may operate to communicate between the different sets of communications circuitry 210 found in the multiple communications devices.

In some embodiments, communications device 200 may include microphone 214. For example, communications device 200 may include microphone 214 to allow the user to transmit audio (e.g., voice audio) during a communications operation or as a means of setting conditional communication settings to a recipient of an outgoing communication. Microphone 214 may be incorporated in communications device 200, or may be remotely coupled to communications device 200. For example, microphone 214 may be incorporated in wired headphones, or microphone 214 may be incorporated in a wireless headset.

Communications device 200 may include any other component suitable for performing a communications operation. For example, communications device 200 may include a power supply, ports or interfaces for coupling to a host device, a secondary input mechanism (e.g., an ON/OFF switch), or any other suitable component.

In some embodiments, communications device 200 may also include a location module (not shown). Although the location module may be implemented in software, in some embodiments, the location module may also be implemented in hardware, firmware, or any combination of software, hardware, and firmware. For example, the location module may include an application process, thread, or subroutine configured to compute the position, orientation, movement, or location of communications device 200. The location of communications device 200 may be derived from any suitable trilateration or triangulation technique, in which case the location module may include a Global Position System (GPS) receiver, RF triangulation detector or sensor, or any other location circuitry configured to determine the geographic or physical location of communications device 200. The location module may also include the associated applications to support the location circuitry. The location module may also include one or more sensors or circuitry for detecting the position, orientation, or movement of communications device 200. Such sensors and circuitry may include, for example, single-axis or multi-axis accelerometers, angular rate or inertial sensors (e.g., optical gyroscopes, vibrating gyroscopes, gas rate gyroscopes, or ring gyroscopes), magnetometers (e.g., scalar or vector magnetometers), and linear velocity sensors. For example, processing circuitry 212 may be configured to read data from one or more of the sensors or circuitry in the location module in order to determine the orientation of communications device 200 and its velocity. The derivation of the location of a communications device is described in more detail in pending U.S. patent application Ser. No. 12/005,822, U.S. Patent Publication No. 2009/0170532, filed Dec. 28, 2007, and entitled "Event-Based Modes For Electronic Devices", which is incorporated by reference herein in its entirety.

A user may direct communications device 200 to perform a communications operation using any suitable approach. As one example, a user may receive a communications request from another device (e.g., an incoming telephone call, an email or text message, or an instant message), and may initiate a communications operation by accepting the communications request. As another example, the user may initiate a communications operation by identifying another device and transmitting a request to initiate a communications operation (e.g., dialing a telephone number, sending an email, typing a text message, or selecting a chat screen name and sending a chat request).

FIGS. 3-10 shows various display screens of transmitting devices (see, e.g., transmitting device 300 of FIG. 3), where the appearance of each display screen depends on the settings a sender chooses for a conditional communication to be transmitted to a recipient, in accordance with an embodiment of the present invention. The transmitting devices shown in FIGS. 3-10 may be the same transmitting device as 101 (FIG. 1) in communications system 100, where transmitting device 101 may include some or all of the features of communications device 200.

Figure 3:
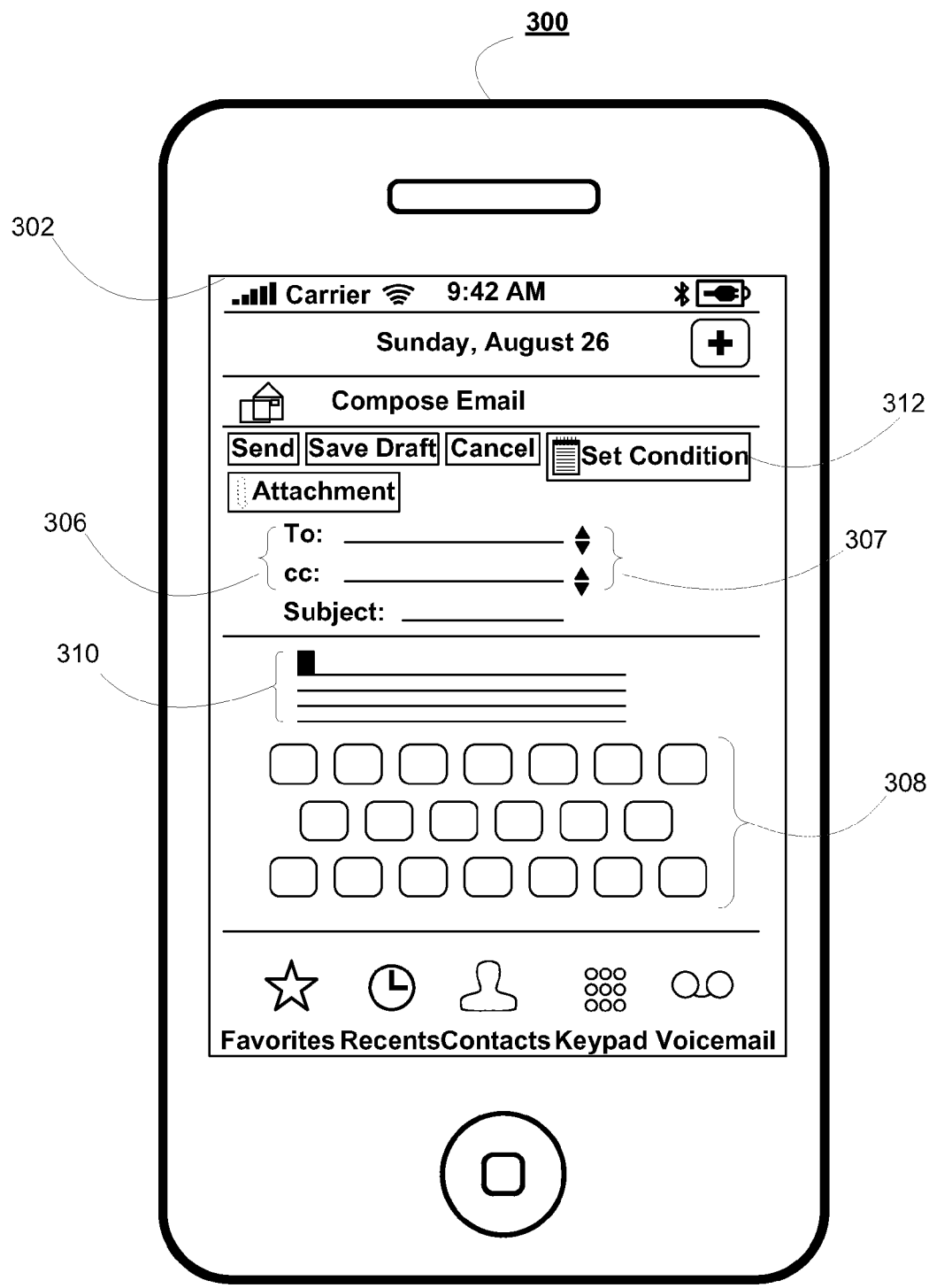
FIGS. 3-10 are illustrative schematic views of the display of a transmitting device in accordance with various embodiments of the present invention.

Transmitting device 300 of FIG. 3 may include display screen 302, which shows an outgoing email communications operation to be initiated by a sender. Although the setting of a conditional communications operation by a sender to a recipient is described herein as an email communications operation for illustrative purposes, the sender's communications operation may comprise any suitable communications operation, such as audio communications operations (e.g., telephone), video communications operations (e.g., video conferencing), or data communications operations (e.g., email, instant messaging, text messaging).

Display screen 302 may include several options and settings for composing a communication. The sender of the communication may select a recipient of the communication by inputting the recipient's contact information (e.g., phone number, email address, or chat screen name) in recipient field 306 using any suitable approach. For example, when a sender selects recipient field 306, display screen 302 may display an address book (not shown) containing a list of contacts and contact information from which the sender may choose. Alternatively, the sender may select arrows 307 in order to scroll through a list of previous contacts. As a further example, the sender may input the recipient's contact information by using touch screen keypad 308. The sender may input any number of recipients into recipient field 306. The recipient input by the sender into recipient field 306 may be set as the target contact or recipient to which conditional communication settings set by the sender may apply. If more than one contact is input into recipient field 306, a further selection may be made by the sender to indicate which contact may be used as the target contacts or recipients to which conditional communication settings set by the sender may apply.

The sender may input an outgoing message into message field 310 using any suitable approach, such as through touch screen keypad 308. To set conditional communication settings for a recipient or recipients of the outgoing communication, the sender may select set condition menu option 312.

Figure 4:
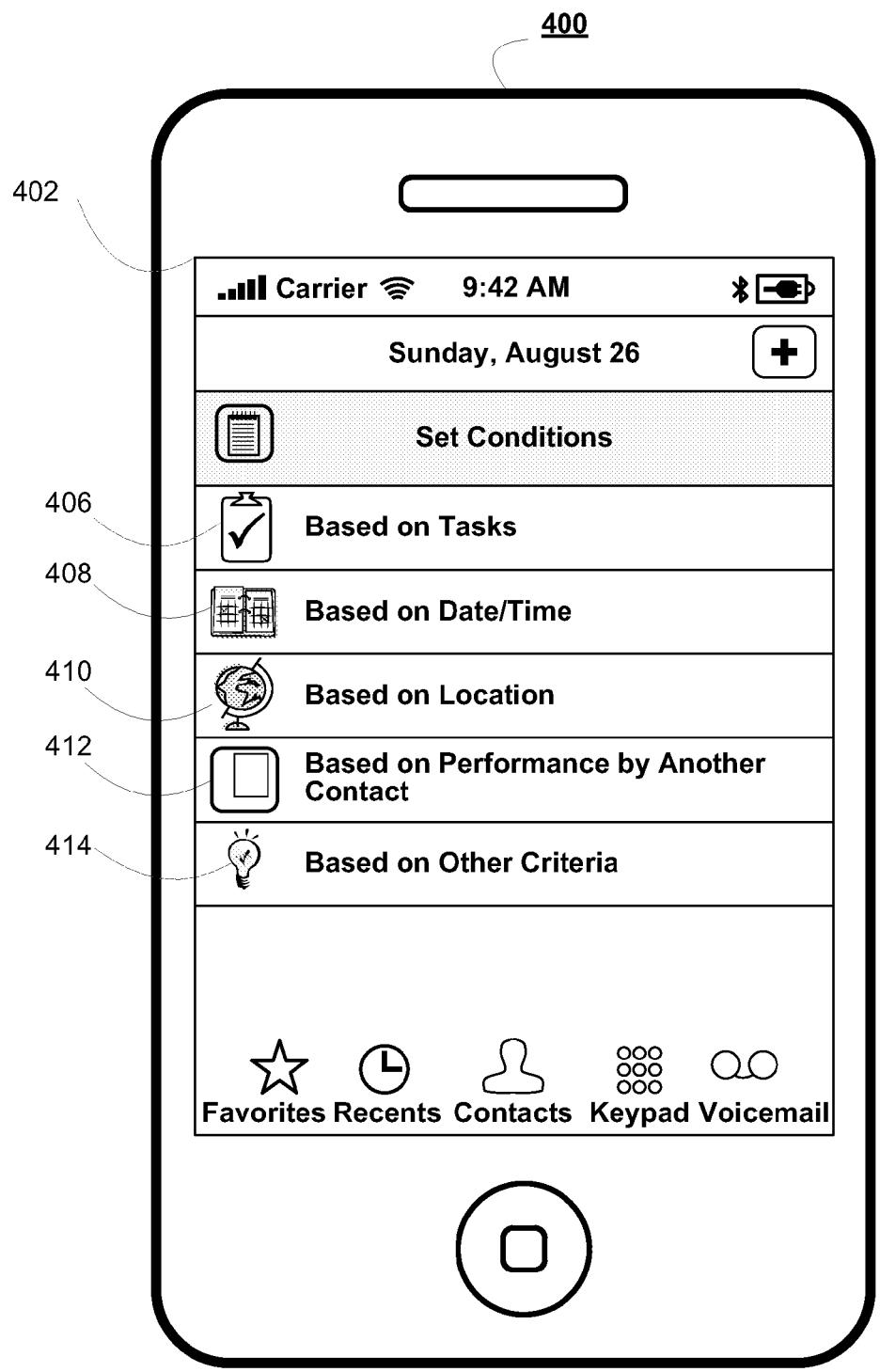

After the sender selects set condition menu option 312, display screen 402 of FIG. 4 may be displayed on transmitting device 400. Transmitting communications device 400 of FIG. 4 may be the same as transmitting devices 101 of FIGS. 1 and 300 of FIG. 3. Display screen 402 of FIG. 4 may include several options for setting conditional communications settings for a recipient or recipients of the outgoing communication, from which the sender may select. For example, the sender may select the condition based on tasks option 406, which may require the recipient of the communication to perform any given number of tasks specified by the sender in order to satisfy the conditional communication settings (e.g., opening an email communication, opening a file attached to the communication, opening the most recent email in an email string, checking a voicemail message, communicating with a third party, or completing a task list as specified by the sender).

Another option the sender may select is condition based on date/time option 408, which may require the expiration of a certain amount of time to satisfy the conditional communication settings. For example, the sender may specify a time of day and/or calendar date upon which the conditional communication settings on the recipient will automatically be removed, thereafter allowing the recipient to perform a communications operation free of the conditioned restriction.

Another option the sender may select is condition based on location option 410, which may require the recipient of a conditional communication, with the recipient's receiving device 102 (FIG. 1), to arrive at a physical or geographic location specified by the sender in order to satisfy the condition. For example, the sender may select conditional communication settings that require the recipient to be located at a physical or geographic location, such as the recipient's home or workplace, in order to satisfy a condition. The recipient's receiving device 102 may contain a location module, which may include a GPS receiving, RF triangulation detector or sensor, or any other location circuitry configured to determine the physical or geographic location of receiving device 102. A more detailed description of the derivation of the location of a communications device is described in more detail in pending U.S. application Ser. No. 12/005,822, U.S. Patent Publication No. 2009/0170532, filed Dec. 28, 2007, and entitled "Event-Based Modes For Electronic Devices", which is incorporated by reference herein in its entirety. Once the location module of receiving device 102 detects that it has reached the location set by the sender, the conditional communication settings on the recipient may automatically be removed, thereafter allowing the receiving device to perform a communications operation free of the conditioned restriction.

Another option the sender may select is condition based on performance by another contact option 412, which requires a contact other than the recipient to perform a task specified by the sender in order for the conditional communication settings to be satisfied. For example, the sender may require that a third party perform a communications operation (e.g., email, phone call, text message or instant message) to the recipient in order to satisfy the condition.

Another option the sender may select is condition based on other criteria option 414, which allows the sender to manually specify a condition to be completed by the recipient of the communications operation. For example, the sender may require the recipient to indicate that he has finished drafting a report in order to satisfy the condition.

Figure 5:
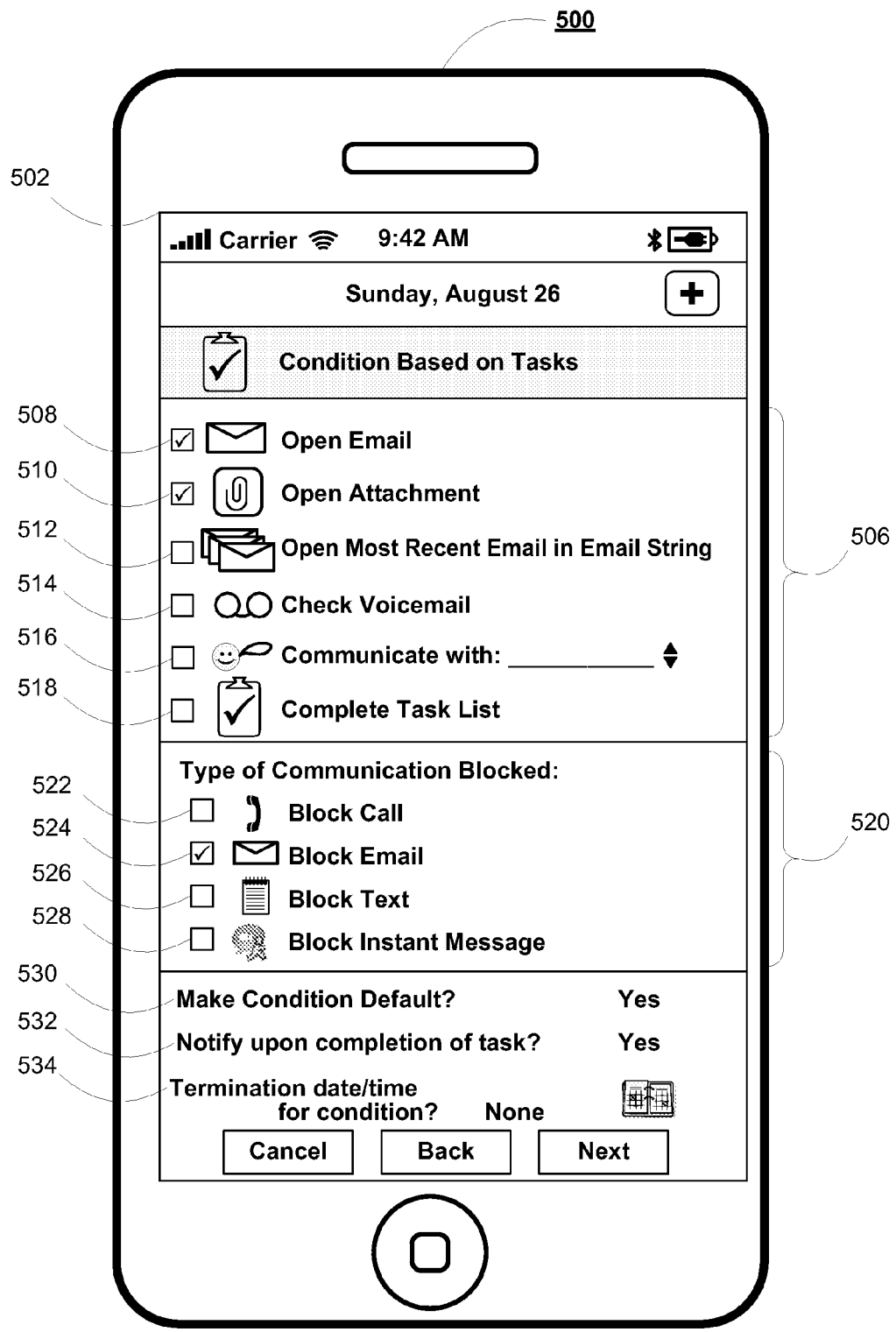

If the sender selects condition based on tasks option 406 of FIG. 4, display screen 502 of FIG. 5 may be displayed on transmitting device 500. Transmitting device 500 of FIG. 5 may be the same as transmitting devices 101, 300 and 400 of FIGS. 1, 3 and 4 respectively. Display screen 502 of FIG. 5 may include several options of task-based conditions 506, from which the sender may select. Options of task-based conditions 506 may include open email option 508, open attachment option 510, open most recent email in email string option 512, check voicemail option 514, communicate with third party option 516, complete task list option 518, or any other suitable task that may be set as a condition.

Open email option 508 may require a recipient to open an email communication in order to satisfy the condition.

Open attachment option 510 may require a recipient to open an attachment to a communications operation.

Open most recent email in email string option 512 may require a recipient to open the most recent email of a string of related email communications. In the absence of setting this condition, an email communication sent to more than one recipient may result in multiple email strings, because more than one recipient may transmit a reply email communication, regardless of whether another recipient has already replied to an email communication. Setting open most recent email in email string option 512 on all recipient contacts eliminates the creation of multiple email strings by recipient contacts, because any recipient seeking to reply to the email communication must open and respond to the most recent email communication of the email string beforehand. A receiving device 102 (FIG. 1) may detect whether the most recent email communication of an email string has been opened by any suitable means, such as by matching text in the subject lines of the email communication, or by matching metadata transmitted with the email communication (e.g., checking time stamps).

Check voicemail option 514 may require the recipient to check a voicemail left on a receiving device 102 (FIG. 1) in order to satisfy the condition.

Communicate with third party option 516 may require the recipient to initiate and transmit a communications operation with a third party in order to satisfy the condition. Communicate with third party option 516 may include additional options that allows a sender to specify which third party the recipient must contact, and what type of communications operation the recipient must perform with the third party (e.g., telephone call, email, text message or instant message).

Complete task list option 518 may allow a sender to create a customized task list for the recipient in case none of the above options match the sender's preferred condition type. Selecting complete task list option 518 may direct the sender to another display screen (not shown) where the sender can manually input a customized task list that the recipient must perform in order to satisfy the condition.

Open email option 508, open attachment option 510, and check voicemail option 514 may not be limited to emails, attachments or voicemails sent by the sender, but the sender instead may further specify a third party from whom the recipient must receive such communication operation in order for the task-based condition to be satisfied.

Display screen 502 of FIG. 5 may also include several options of blocked communications 520 from which the sender may select. A sender may select one of these options to indicate the type of communications operation he wishes to restrict the recipient from performing until the condition specified by the sender is satisfied. Options of blocked communications 520 may include, for example, block call option 522, block email option 524, block text option 526, and block instant message option 528. Block call option 522 prevents a recipient from performing a telephone communications operation with the sender and/or blocked contact until the sender-specified condition is satisfied. Block email option 524 prevents a recipient from performing an email communications operation with the sender and/or blocked contact until the sender-specified condition is satisfied. Block text option 526 prevents a recipient from performing a text message communications operation with the sender and/or blocked contact until the sender-specified condition is satisfied. Finally, block instant message option 522 prevents a recipient from performing an instant message communication operations with the sender and/or blocked contact until the sender-specified condition is satisfied. The options of blocked communications 520 may not be limited to communications operations addressed to the sender, but may further allow the sender to specify a third party to whom the recipient is restricted from sending a communication until the sender-specified condition is met.

Display screen 502 of FIG. 5 may also include several other options in addition to the options of task-based conditions 506 and options of blocked communications 520 described above, such as make condition default option 530, notify upon completion of task option 532, and termination date/time for condition option 534. Selecting "Yes" for make condition default option 530 may set the conditional communication settings specified by the sender as the default setting for the recipient. For example, if the sender sets a condition requiring the recipient to open the sender's email and attachment, and also selects to block the recipient from transmitting an email communications back to the sender, the recipient will be blocked from transmitting any email communications to the sender so long as the recipient has any unopened email or attachment from the sender in his mailbox.

Another additional option that display screen 502 of FIG. 5 may include is notify upon completion of task option 532. Selecting "Yes" for this option instructs the recipient's receiving device 102, upon satisfaction of the condition, to transmit a notification to the sender's transmitting device 500 to alert the sender that the condition has been satisfied. Such a notification may take the form of an audible tone or voice message ("Task condition satisfied by Alex"), a visual cue that may blink or flash or change color, a message displayed on the transmitting device 500 (e.g., as a received text message), a vibration of transmitting device 500, or any other suitable option.

Finally, display screen 502 may include termination date/time for condition option 534. This option allows the sender to set a date and/or time at which the conditional communication settings will automatically terminate. This option may be useful in instances where satisfaction of a condition will no longer be necessary after a certain date and/or time.

Figure 6:
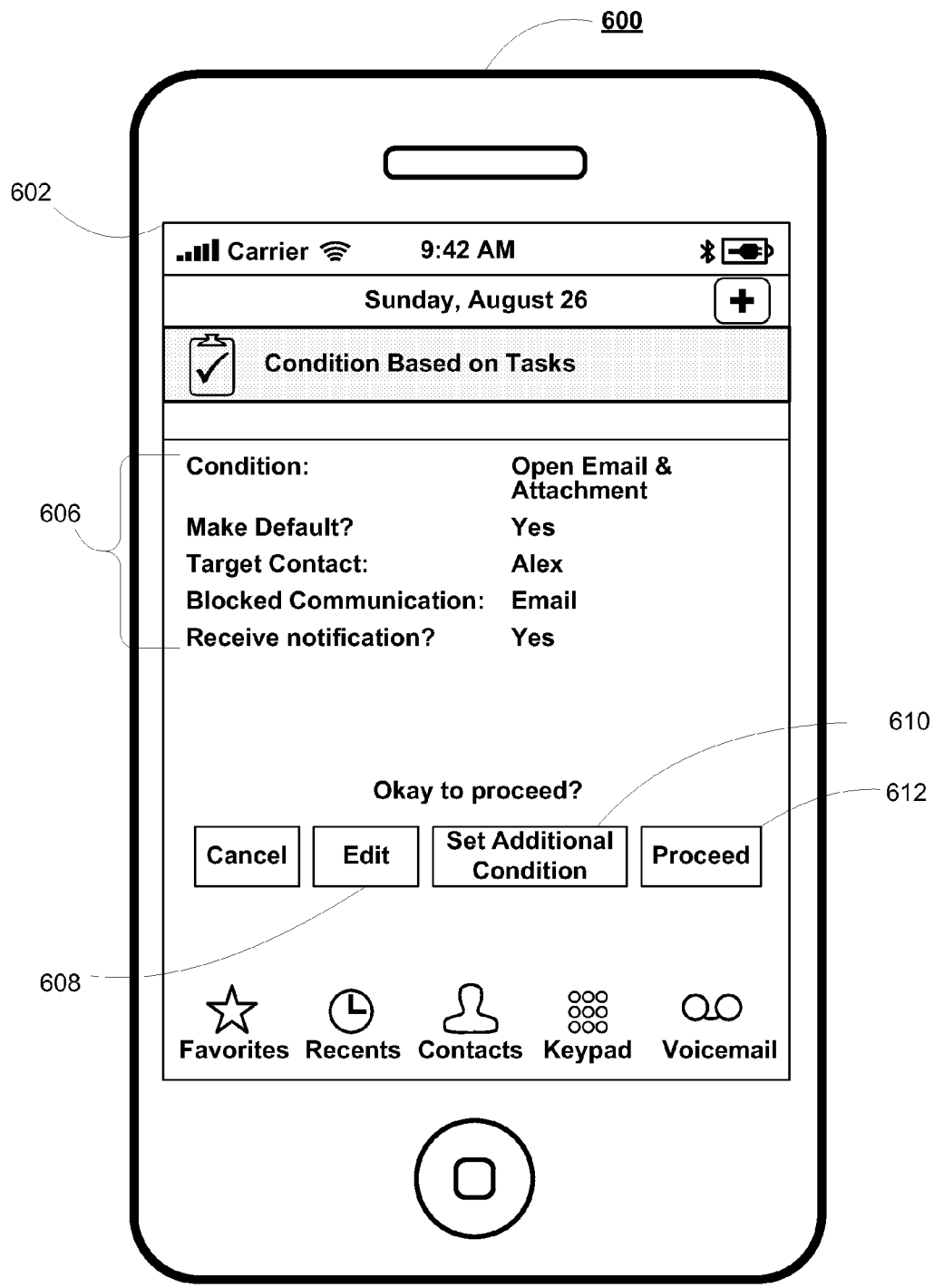

After the sender selects all of his desired settings on display screen 502 of FIG. 5, display screen 602 of FIG. 6 may be displayed on transmitting device 600. Transmitting device 600 of FIG. 6 may be the same transmitting devices as 101, 300, 400 and 500 of FIGS. 1, 3, 4 and 5 respectively. Display screen 602 of FIG. 6 provides the sender with a summary 606 of the selections made on display screen 502 (FIG. 5). The sender may edit or modify any of the selections in summary 606 directly in the fields provided in summary 606. Alternatively, the sender may select edit option 608, which may return the sender to display screen 502 (FIG. 5), where the sender can edit or modify his selections. The sender may also set an additional condition by selecting set additional condition option 610. Selecting set additional condition option 610 may return the sender to display screen 402 (FIG. 4), where the sender can set another condition. If the sender is satisfied with the settings summarized in summary 606, the sender may select proceed option 612. Selecting proceed option 612 may return the sender to display screen 302 (FIG. 3), where the sender may complete the composition of the communication and transmit it with the selected conditional communication settings.

As an alternative or in addition to setting a condition based on tasks, a sender may also set a condition based on the expiration of a date/time. To set a condition based on date or time, the sender, in FIG. 4, may select condition based on date/time menu option 408 on display screen 402 of transmitting device 400. If the sender selects condition based on date/time menu option 408, display screen 702 of FIG. 7 may be displayed on communications device 700. Transmitting device 700 of FIG. 7 may be the same transmitting devices as

101, 300, 400, 500 and 600 of FIGS. 1, 3, 4, 5 and 6 respectively. The sender may set a condition that may be satisfied upon the expiration of a time of day, a date, an amount of time elapsed since a prior communication with an individual, or any other suitable criterion based on date/time.

For example, display screen 702 may present a calendar 706 to allow the sender to set a particular date upon which the condition will be satisfied. A calendar may include any suitable program, method, or device capable of tracking the present date for transmitting device 700, such as the calendar function of an iPod or an iPhone. In some embodiments, a calendar may be an external calendar, such as the calendar function in Microsoft Outlook® or Apple Inc.'s iCal application, synched to processing circuitry 212 (FIG. 2), and together capable of tracking the current date for transmitting device 700.

Display screen 702 may also present a clock 708 to allow the sender to set a particular time of day upon which the condition will expire. A clock may include any suitable program, method or device capable of keeping time for transmitting device 700. In some embodiments, a clock may also be external to communications device 700, but synched to processing circuitry 212 (FIG. 2) to keep track of the time for transmitting device 700.

Display screen 702 may also include a further option (not shown) to allow a condition to be satisfied upon a sender-specified amount of time elapsed since receiving, opening or listening to a received communication. For example, the sender may set a condition restricting the recipient from performing a reply communications operation until three hours after the recipient has opened an email communication by the sender.

In addition, display screen 702 may also include options of blocked communications 720, which may be the same as options of blocked communications 520 (FIG. 5). Options of blocked communications 720 may include blocking a telephone call, an email, a text, an instant message, or any other communications operation by the recipient. Display screen 702 may also include make condition default option 730 and notify upon completion of task option 732, which provide the same functions as make condition default option 530 and notify upon completion of task option 532 (FIG. 5). An additional option that may be included for a condition based on date/time is auto-delete communication option 734. Setting auto-delete communication option 734 to "Yes" instructs the recipient's communications device to automatically delete the sender's communication upon expiration of date/time. Auto-delete communication option may save the recipient from wasting time spent reading or listening to a communication when reading or listening to the communication is moot or no longer necessary.

Figure 7:
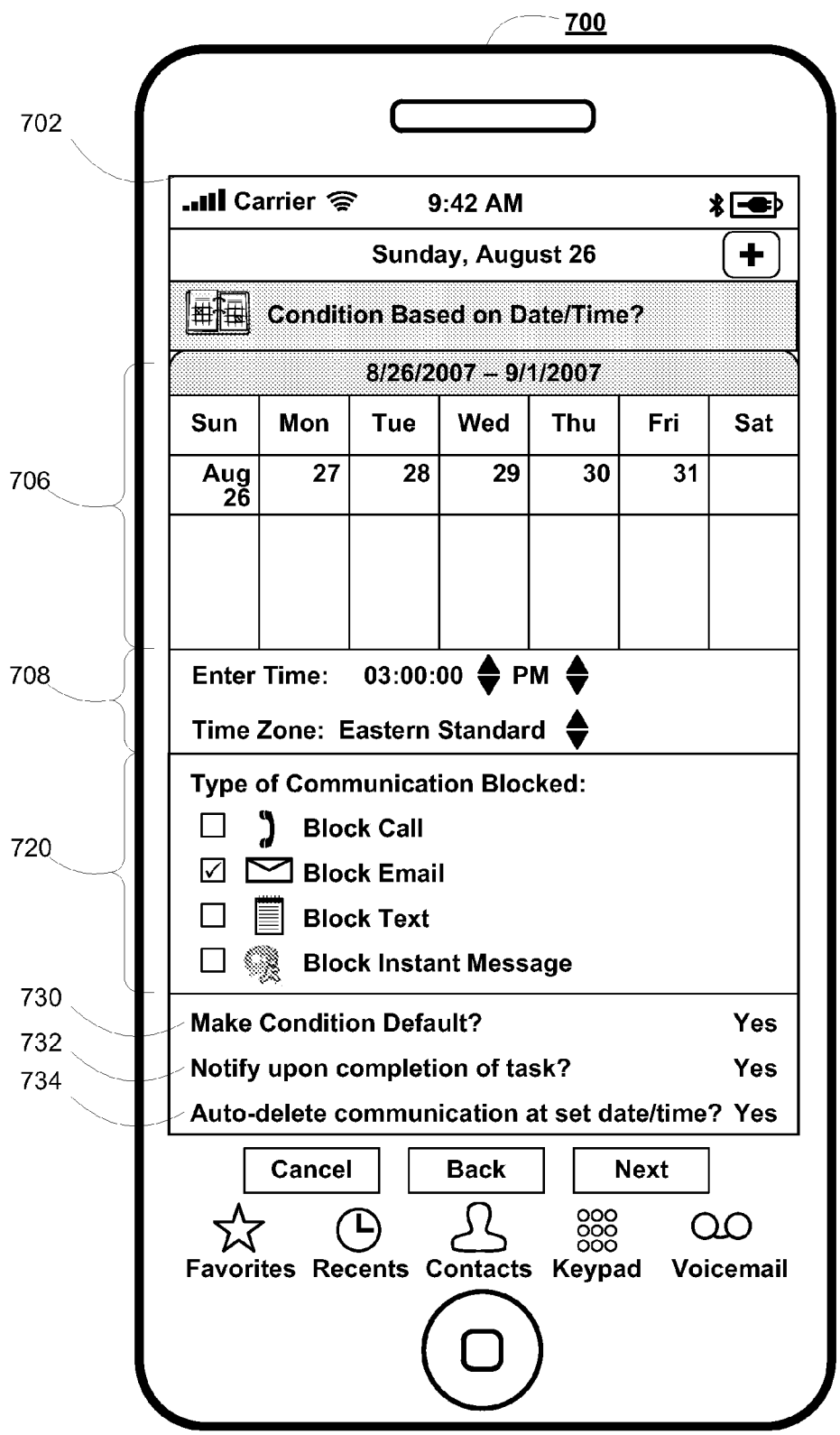

After the sender selects all desired settings on display screen 702 of FIG. 7, a display screen similar to display screen 602 of FIG. 6 may be displayed, except that summary 606 will describe the settings selected by the sender from display screen 702 in FIG. 7. The sender may then select edit option 608, set addition condition option 610, or proceed option 612 (FIG. 6).

As an alternative or in addition to setting a condition based on tasks or based on date/time, a sender may also set a condition based on the recipient, the sender, or a third party arriving at a location specified by the sender. To set a condition based on location, the sender may select condition based on location option 410 (FIG. 4) on display screen 402 of transmitting device 400. If the sender selects condition based on location menu option 410, display screen 802 of FIG. 8 may be displayed on transmitting device 800. Transmitting device 800 of FIG. 8 may be the same transmitting communications devices as 101, 300, 400, 500, 600 and 700 of FIGS. 1, 3, 4, 5, 6 and 7 respectively.

Figure 8:
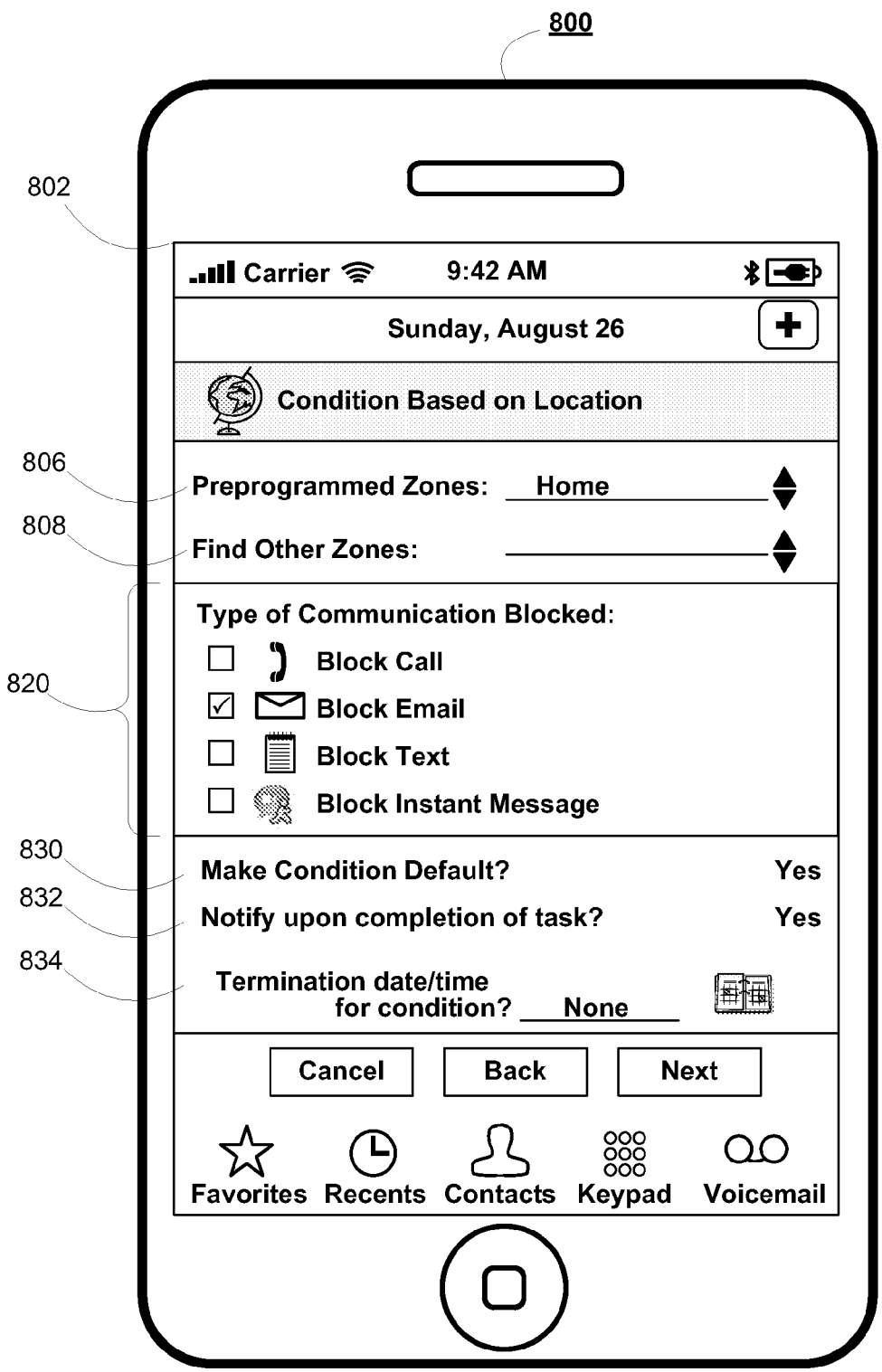

In display screen 802 of FIG. 8, a sender may set as a condition a physical or geographic location or environment, which will be referred to herein as a "zone" in which the recipient and receiving device 102 must be located in order to satisfy the condition. A zone may include any suitable geographical or physical location or environment. Zones may be co-existent with (or partially overlap) other zones. For example, one zone may be defined to include the recipient's home address (and its immediately surrounding area). Zones may be defined by any suitable location information from which a location may be derived. In some embodiments, location information includes geographic coordinates specified in the World Geodetic System 1984 (WGS 84) standard. Any other suitable standard may also be used to define geographic coordinates in other embodiments. These standards may utilize any suitable reference system (and any suitable reference ellipsoid). Zones may be defined by bounded coordinates or by a geographic zone center and corresponding distances from the zone center in one or more compass directions. The defining of "zones" and the derivation of the location of a communications device is described in more detail in pending U.S. application Ser. No. 12/005,822, U.S. Patent Publication No. 2009/0170532, filed Dec. 28, 2007, and entitled "Event-Based Modes For Electronic Devices", which is incorporated by reference herein in its entirety.

Display screen 802 may present preprogrammed zones option 806, where the sender may select a zone that has been preprogrammed into the transmitting device 101 and receiving device 102 (e.g., the recipient's home address). Display screen 802 may also present find other zones option 808, where the sender may further be directed to additional menu options from which the sender may define a zone (e.g., by address, by landmark, by geographic coordinates, by environment, or any other suitable standard) that has not been preprogrammed into the communications devices. Display screen 802 may include an option for the sender to define a location condition as being satisfied when a particular contact is at an identified location, leaves an identified location, or combinations thereof (e.g., the condition is met when the recipient leaves the school zone or enters the recipient's home). In some embodiments, display screen 802 may provide the user with an option to select one or more contacts or communications devices to which the location condition is applied (e.g., the condition is met when the identified contacts or communications devices are at the location identified by the sender).

Display screen 802 may also include options of blocked communications 820, which may function in the same way as options of blocked communications 520 (FIG. 5). Options of blocked communications 820 may include blocking a telephone call, an email, a text, or an instant message. Display screen 802 may also include make condition default option 830, notify upon completion of task option 832, and termination date/time for condition option 834, which provide the same functions as make condition default option 530, notify upon completion of task option 532, and termination date/time for condition 534 (FIG. 5).

After the sender selects all of his desired settings on display screen 802 of FIG. 8, a display screen similar to display screen 602 (FIG. 6) may be displayed, except that summary 606 will describe the settings selected by the sender from display screen 802 of FIG. 8. The sender may then select edit option 608, set addition condition option 610, or proceed option 612 (FIG. 6).

As an alternative or in addition to setting a condition based on tasks, date/time, or location, a sender may also set a condition based on the performance of a third party other than the sender or the recipient. To set a condition based on performance by a third party, the sender select condition based on performance by another contact option 412 (FIG. 4) on display screen 402 of communications device 400. If the sender selects condition based on performance by another contact option 412, display screen 902 of FIG. 9 may be displayed on transmitting communications device 900. Transmitting communications device 900 of FIG. 9 may be the same transmitting communications devices as 101, 300, 400, 500, 600, 700 and 800 of FIGS. 1, 3, 4, 5, 6, 7 and 8 respectively.

Figure 9:
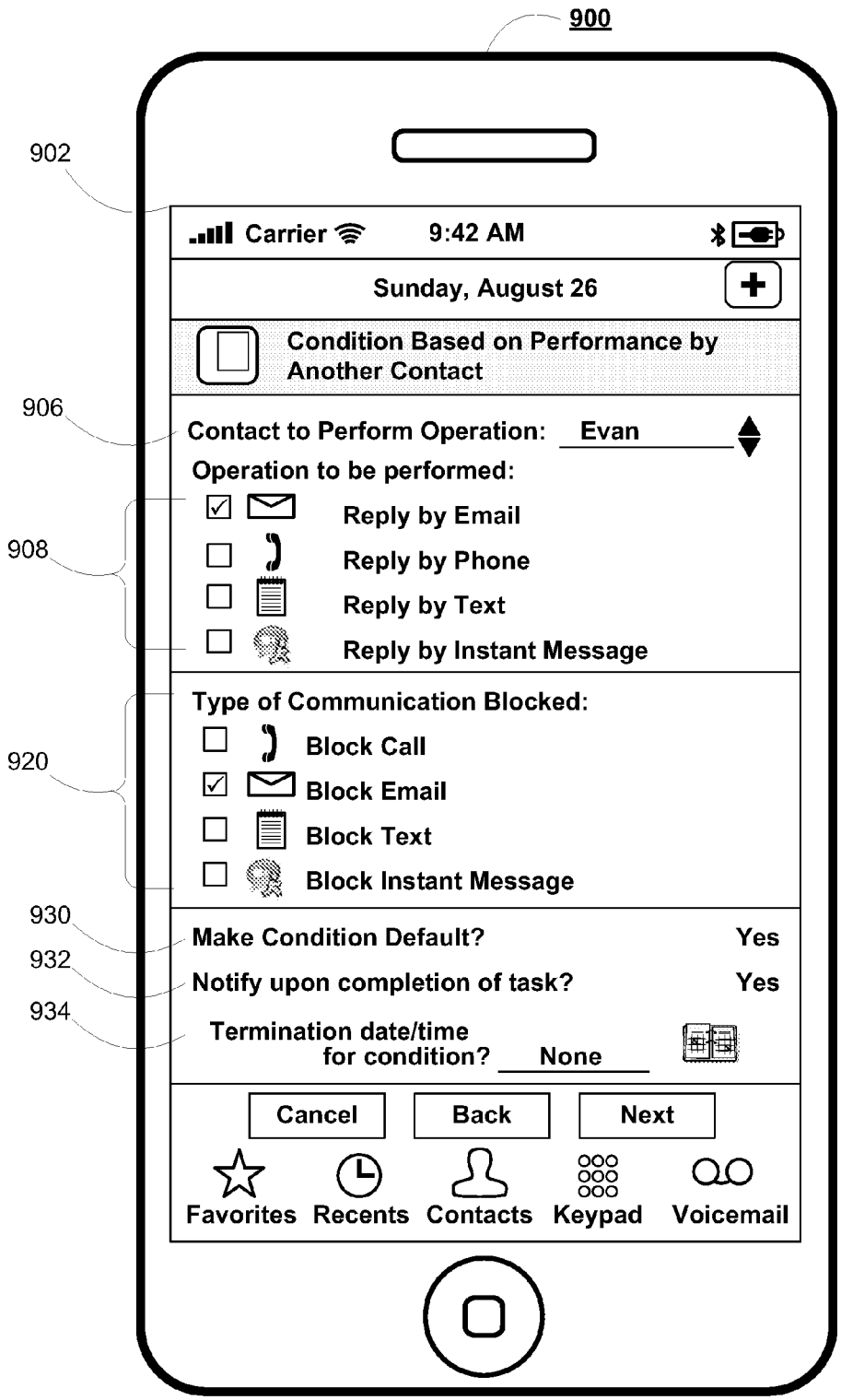

Display screen 902 of FIG. 9 may include contact to perform operation option 906, where the sender may provide/identify a third party to perform the conditioned task. The third party may be input into contact to perform operation option 906 by any suitable means, such as by manually inserting the contact name, selecting the contact from an address book, or selecting the contact from a list of previous contacts). Display 902 may also include several options to be performed by third party 908, from which the sender may select. Options to be performed by third party 908 may include options such as the third party sending the recipient an email, making a phone call to the recipient, sending a text message to the recipient, or sending an instant message to the recipient.

Display screen 902 may also include options of blocked communications 920, which may function in the same way as options of blocked communications 520 (FIG. 5). Options of blocked communications 920 may include blocking a telephone call, an email, a text, or an instant message. Display screen 902 may also include make condition default option 930, notify upon completion of task option 932, and termination date/time for condition option 934, which provide the same functions as make condition default option 530, notify upon completion of task option 532, and termination date/time for condition 534 of FIG. 5.

After the sender selects all of the desired settings on display screen 902 of FIG. 9, a display screen similar to display screen 602 (FIG. 6) may be displayed, except that summary 606 will describe the settings selected by the sender from display screen 902 of FIG. 9. The sender may then select edit option 608, set addition condition option 610, or proceed option 612 (FIG. 6).

As an alternative or in addition to setting a condition based on tasks, date/time, location, or by performance by a third party, a sender may also set a condition based on any other criteria, which the sender may manually input. To set a condition based on other criteria, the sender may select condition based on other criteria option 412 (FIG. 4) on display screen 402 of communications device 400. If the sender selects condition based on other criteria option 412, display screen 1002 of FIG. 10 may be displayed on transmitting communications device 1000. Transmitting communications device 1000 of FIG. 10 may be the same transmitting communications devices as 101, 300, 400, 500, 600, 700, 800 and 900 of FIGS. 1, 3, 4, 5, 6, 7, 8, and 9 respectively.

Figure 10:
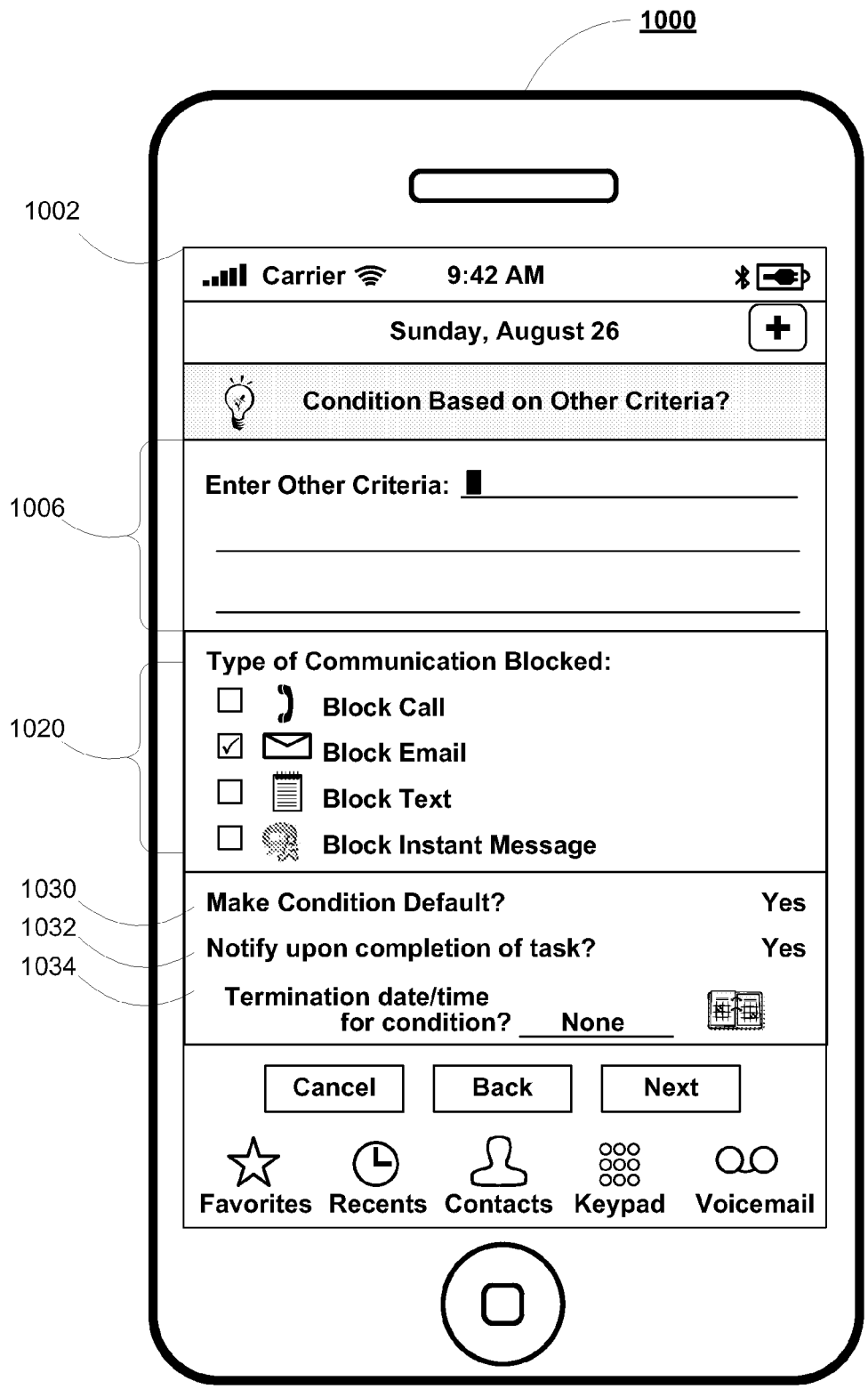

Display screen 1002 of FIG. 10 may include other criteria option 1006, where the sender may use a touch screen keypad (not shown), or any other suitable approach, to input a textual description of other conditional communication criteria that recipient must indicate have been satisfied in order to remove conditional communication settings from the recipient.

Display screen 1002 may also include options of blocked communications 1020, which may function in the same way as options of blocked communications 520 of FIG. 5. Options of blocked communications 1020 of FIG. 10 may includes blocking a telephone call, an email, a text, or an instant message. Display screen 1002 may also include make condition default option 1030, notify upon completion of task option 1032, and termination date/time for condition option 1034, which provide the same functions as make condition default option 530, notify upon completion of task option 532, and termination date/time for condition 534 of FIG. 5.

In some embodiments, a user may set a condition for a communications operation to expire or be waived when particular criteria is met. For example, a condition may expire after a given time delay (described above), or based on a location of the sender, the recipient, or a third party (also described above). As another example, a condition for a communications operation may be set to expire when the sender, the recipient, or a third party perform a particular communications operation. For example, if the sender and recipient contact each other and carry out a conversation (e.g., over the telephone), conditions previously set for communications between the sender and the recipient may be set to expire. As another example, if a condition is set for a recipient to read a particular email from a third party, and the recipient performs a communications operation with the third party (e.g., chats with the third party), the condition for communications operations between the sender and recipient may expire or be waived. As still another example, a condition for a communications operation may be set to expire if the recipient performs an operation related to the set condition (e.g., if the condition was to read an email attachment regarding a software developer kit, and the recipient surfs the Internet and accesses a more detailed software developer kit, the condition may be set to expire).

After the sender selects all of the desired settings on display screen 1002 of FIG. 10, a display screen similar to display screen 602 (FIG. 6) may be displayed, except that summary 606 will describe the settings selected by the sender from display screen 1002 of FIG. 10. The sender may then select edit option 608, set addition condition option 610, or proceed option 612 (FIG. 6).

FIG. 11 shows data structure 1100 for storing conditional communication settings on a transmitting device such as transmitting device 101 (FIG. 1). Although data structure 1100 takes the form of a table in a relational database in the example of FIG. 11, any other data structure may be used in other embodiments. Data structure 1100 may be stored on transmitting device 101 (FIG. 1), which may include some or all of the features of communications device 200 (FIG. 2). For example, data structure 1100 may be stored in memory 208 (FIG. 2). Transmitting device 101 (FIG. 1) may store conditional communication settings entered by the sender, as demonstrated through FIGS. 3-10, into data structure 1100. Conditional communication settings may be added or removed from data structure 1100 in real-time from transmitting device 101 (FIG. 1).

In the example of FIG. 11, data structure 1100 includes condition type column 1102, condition value column 1104, default column 1106, target contact column 1108, blocked communication column 1110, terminate condition date/time column 1112, notification column 1114, and condition status column 1116. Condition type column 1102 may include data input by the sender as demonstrated in FIG. 4, where the sender selects a type of condition: condition based on tasks option 406, condition based on date/time option 408, condition based on location option 410, condition based on performance by another contact option 412, or condition based on other criteria menu option 414.

Condition value column 1104 may include settings input by the sender, where the sender sets the condition type that must be satisfied by the recipient. If the condition type is based on a task, then the settings stored in condition value column 1104 may include open email option 508, open attachment option 510, open most recent email in email string option 512, check voicemail option 514, communicate with third party option 516, complete task list option 518, or any combination of options of task-based conditions 506 in FIG. 5. If the condition type is based on date/time, then the settings stored in condition value column 1104 may include the date/time values that the sender inputs in calendar 706 and/or clock 708 (FIG. 7). If the condition type is based on location, then the settings stored in condition value column may include the zone defined by the sender in either preprogrammed zones option 806 or find other zones option 808 (FIG. 8). If the condition type is based on performance by a third party, then condition value column 1104 may store the name of the third party to perform an operation, as input by the sender in contact to perform operation option 906 (FIG. 9), and the operation to be performed by the third party, which may be any of the operations included in the operation to be performed option 908 (FIG. 9). Finally, if the condition type is based on other criteria, then condition value column may include a text description of the criteria input by the sender in criteria description option 1006 (FIG. 10).

Default column 1106 of FIG. 11 may include a boolean value that may indicate whether or not the condition set by the sender will be the default setting for the recipient. The boolean value for default column 1106 may be set by the sender through make condition default setting option 530 (FIG. 5), for example.

Target contact column 1108 of FIG. 11 may include information input by the sender that identifies the recipient for whom the condition is set. The recipient may be input by the sender through recipient field 306 (FIG. 3). If more than one contact is input into recipient field 306, the sender may further designate which of the contacts are recipients for whom the condition is set. More than one recipient may be designated by the sender as a target contact.

Blocked communication column 1110 of FIG. 11 stores settings that indicate the type of communication operation that the recipient will be restricted from performing until the set condition is satisfied. The settings for blocked communication column 1110 may be input by the sender through options of blocked communications 520 (FIG. 5), for example. The blocked communication may include any mode of communications operation (e.g., audio, video, or data communications).

Terminate condition date/time column 1112 of FIG. 11 may store date/time settings at which the set condition will automatically terminate. The date/time settings for column 1112 may be input by the sender through termination date/time for condition option 534 (FIG. 5), for example. In some embodiments, where the condition type is already based on date/time, the sender may specify whether the communication itself should be automatically deleted upon expiration of the conditioned date/time. The setting indicating whether or not the communication should be automatically deleted may be input by the sender through auto-delete communication option 734 (FIG. 7), and it may be stored in terminate condition date/time column 1112.

Notification column 1114 of FIG. 11 may include a boolean value that may indicate whether or not the sender requests a notification upon satisfaction of the set condition. The sender may input the boolean value through notify upon completion of task option 532 (FIG. 5).

If the setting in notification column 1114 is "Yes", then condition status column 1116 of FIG. 11 may include information received from receiving device 102 that indicates the status of the condition. If transmitting device 101 has not received notification from receiving device 102 that the condition has been satisfied, then condition status column 1116 may include information indicating that the condition is "not satisfied." Where the condition set by the sender has been satisfied, receiving device 102 may transmit information (e.g., date/time information) to transmitting device 101 indicating that the condition has been satisfied, and condition status column 1116 may store the date/time information of when the condition was satisfied.

Figure 12:
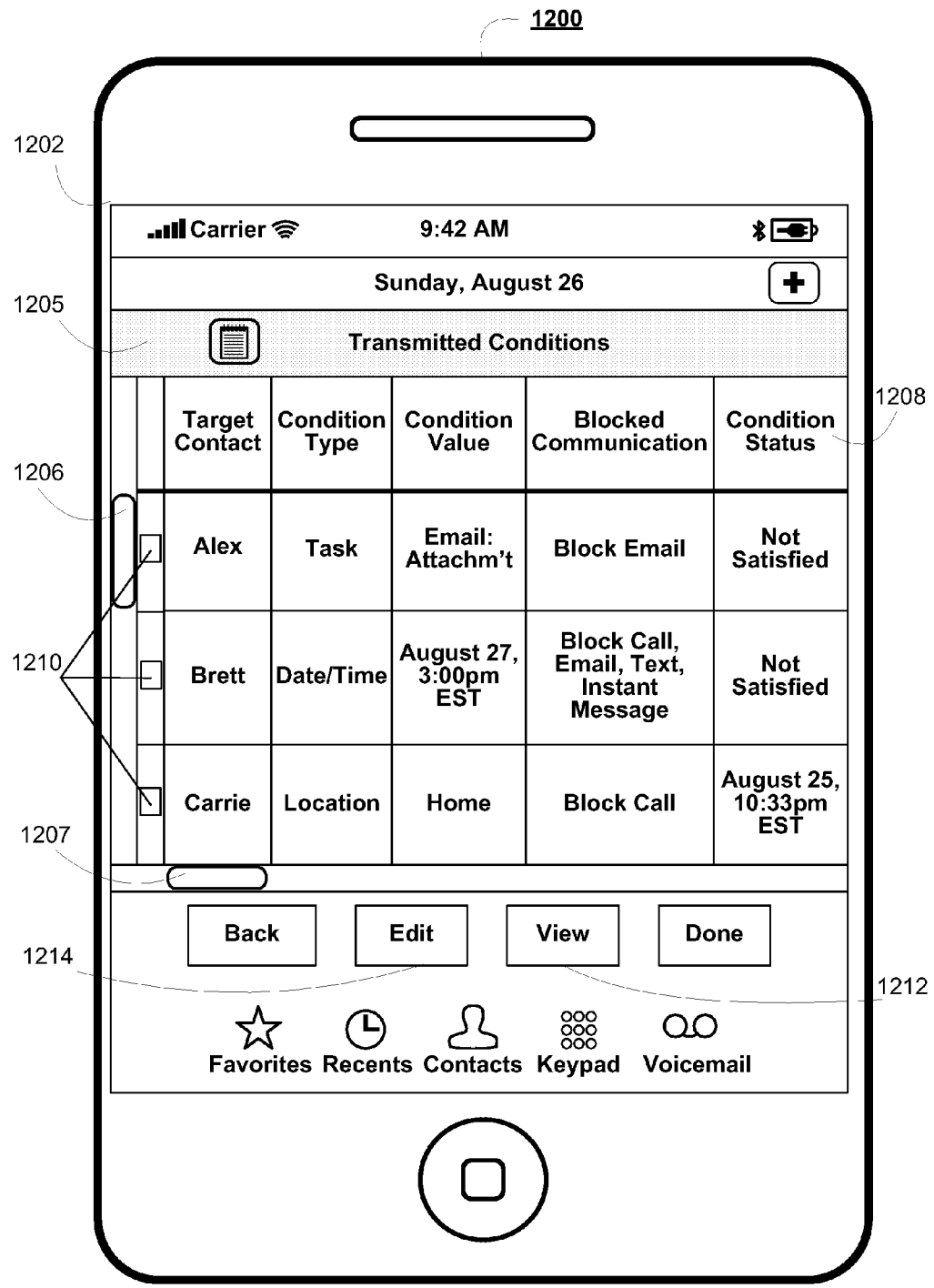
FIG. 12 is an illustrative schematic view of the display of a transmitting device in accordance with one embodiment of the present invention.

A portion or all of the information stored in data structure 1100 may be displayed on transmitting device 101. FIG. 12 shows a transmitting device 1200 with a display screen 1202, which displays a summary 1205 of the conditional communication settings stored in data structure 1100 (FIG. 11). Scroll bars 1206 and 1207 may be used to scroll up and down or side to side in order to view the information included in the summary. Condition status column 1208 may provide the sender with information, in conjunction with an alert or notification, of whether and when a set condition has been satisfied. The data for condition satisfied column 1208 may be obtained from condition status column 1116 (FIG. 11). The sender may indicate whether he wishes to receive a notification through notify upon completion of task option 532 (FIG. 5), for example. The sender may view all details of a row by selecting a select row box 1210, then selecting view box 1212. This operation may direct the sender to another display screen (not shown) that displays all of the conditional communication settings for the selected row. The sender may also edit an unsatisfied condition by selecting the appropriate select row box 1210, then selecting edit box 1214.

After the sender has completed composing his communications operation and setting the conditional communication settings to be applied to the recipient, transmitting device 101 (FIG. 1) may transmit the appropriate row of conditional communication settings stored in data structure 1100 (FIG. 11) as part of the communications operation to receiving device 102 (FIG. 1) via communications network 110 (FIG. 1). The conditional communication settings may then be extracted from the communications operation by receiving device 102 (FIG. 1) and stored in a data structure such as that shown in FIG. 13. FIG. 13 shows a data structure 1300 for storing transmitted conditional communication settings in a receiving device 102 (FIG. 1). Although data structure 1300 takes the form of a table in a relational database in the example of FIG. 13, any other data structure may be used in other embodiments. Receiving device 102 (FIG. 1) may include some or all of the features of communications device 200 (FIG. 2), and data structure 1300 may be stored in memory 208 (FIG. 2). Conditional communication settings may be added or removed from data structure 1300 in real-time.

In some embodiments, transmitting device 101 (FIG. 1) may transmit the appropriate row of conditional communication settings stored in data structure 1100 (FIG. 11) as part of a communications operation to a remote server (not shown) within communications network 110 (FIG. 1). The remote server may contain a memory, which may be similar to memory 208 (FIG. 2), and processing circuitry, which may be similar to processing circuitry 212 (FIG. 2). The conditional communication settings may be extracted from the communications operation by the remote server and stored in a data structure such as that shown in FIG. 13, which may be located in the memory within the server. The remote server may then transmit the communication and conditional communication settings to receiving device 102 (FIG. 1). In some embodiments, receiving device 102 may communicate with the processing circuitry in the remote server to determine if it is authorized to perform a particular communications operation.

In the example of FIG. 13, data structure 1300 includes condition type column 1302, condition value column 1304, default column 1306, blocked communication column 1308, blocked contact column 1310, terminate condition date/time column 1312, notification column 1314 and condition status column 1316. Condition type column 1302 may include information input by the sender into transmitting device 400 from FIG. 4, where the sender selects a type of condition: condition based on tasks option 406, condition based on date/time option 408, condition based on location option 410, condition based on performance by another contact option 412, or condition based on other criteria option 414. The condition type settings are transmitted from transmitting device 400 to receiving device 102 (FIG. 1) through communications network 120 (FIG. 1).

Condition value column 1304 of FIG. 13 may include information input by the sender, where the sender sets the condition that must be satisfied by the recipient. The condition value setting is transmitted from transmitting device 101 to receiving device 102 through communications network 120 (FIG. 1). If the condition type is based on a task, then the settings stored in condition value column 1304 may include settings such as open email option 508, open attachment option 510, open most recent email in email string option 512, check voicemail option 514, communicate with third party option 516, complete task list option 518, or any combination of options of task-based conditions 506 (FIG. 5). If the condition type is based on date/time, then the settings stored in condition value column 1304 may include the date and/or time settings that the sender inputs through calendar 706 and/or clock 708 (FIG. 7). If the condition type is based on location, then the data stored in condition value column 1304 may include the zone settings input by the sender in either preprogrammed zones option 806 or find other zones option 808 (FIG. 8). If the condition type is based on performance by a third party, then condition value column 1304 may include the third party to perform an operation, as input by the sender through contact to perform operation option 906 (FIG. 9), and the operation to be performed by the third party, as input by the sender through operation to be performed option 908 (FIG. 9). Finally, if the condition type is based on other criteria, then condition value column 1304 may include a text description of the criteria input by the sender in criteria description option 1006 (FIG. 10).

Default column 1306 of FIG. 13 may include a boolean value that may indicate whether or not the condition information set by the sender for the recipient will be made into the default setting for the recipient. The boolean value for default column 1306 may be set by the sender through make condition default setting option 530 (FIG. 5), for example. The boolean value is transmitted from transmitting device 101 to receiving device 102 through communications network 120 (FIG. 1).

Blocked communication column 1308 of FIG. 13 stores the type of communication operation that the recipient is restricted from performing until the set condition is satisfied. The settings for blocked communication column 1308 may be input by the sender through options of blocked communications 520 (FIG. 5), for example. The blocked communication may include any mode of communication (e.g., audio, video, or data communication). The settings for the type of blocked communication may be transmitted from transmitting device 101 to receiving device 102 through communications network 120 (FIG. 1).

Blocked contact column 1310 of FIG. 13 may include the contact information of the sender of the transmitted communications operation and conditional communication settings. In some embodiments, blocked contact column 1310 may include the contact information of a third party whom the sender selected and to whom the recipient will be prevented from transmitting a communication. The blocked contact settings may be transmitted from transmitting device 101 to receiving device 102 through communications network 120 (FIG. 1).

Terminate condition date/time column 1312 of FIG. 13 may store date/time settings at which the set condition will automatically terminate. The date/time settings at which the set condition will automatically terminate may be input by the sender through termination date/time for condition option 534 (FIG. 5), for example. In some embodiments, where the condition type is already based on date/time, the sender may further specify whether the communication operation should be automatically deleted upon expiration of the conditioned date/time settings. Information indicating whether or not the communication operation should be automatically deleted may be input by the sender through auto-delete communication option 734 (FIG. 7), for example. The settings to be stored in terminate condition date/time column 1312 may be transmitted from transmitting device 101 to receiving device 102 through communications network 120 (FIG. 1).

Notification column 1314 of FIG. 13 may include a boolean value that may indicate whether the sender requests a notification upon satisfaction of the set condition. The sender may set the boolean value through notify upon completion of task option 532 (FIG. 5), for example. The setting to be stored in notification column 1314 may be transmitted from transmitting device 101 to receiving device 102 through communications network 120.

Condition status column 1316 of FIG. 13 may include information that may indicate whether or not a set condition has been satisfied. Receiving device 102 (FIG. 1), which may include processing circuitry 212 of communications device 200 (FIG. 2), may detect whether a set condition has been satisfied by using processing circuitry 212. For example, if the condition is based on a task, as demonstrated through FIG. 5, then processing circuitry 212 of receiving device 102 may communicate with communications circuitry 210 incorporated in receiving device 102 to detect whether the conditioned task has been satisfied. If the condition is based on the expiration of a date/time, as demonstrated through FIG. 7, then processing circuitry 212 in receiving device 102 may communicate with calendar and clock devices incorporated in receiving device 102 to detect whether the date/time has expired. If the condition is based on location, as demonstrated through FIG. 8, then processing circuitry 212 of receiving device 102 may communicate with a location module incorporated in receiving device 102 to detect whether receiving device 102 has entered the conditioned zone set by the sender. If the condition is based on performance by a third party, as demonstrated through FIG. 9, then processing circuitry 212 of receiving device 102 may communicate with communications circuitry 210 incorporated in receiving device 102 to detect whether the third party has performed the conditioned task set by the sender. Finally, if the condition is based on other criteria, as demonstrated through FIG. 10, then processing circuitry 212 of receiving device 102 may communicate with communications circuitry 210 incorporated in receiving device 102 to detect whether the recipient has indicated completion of the conditioned criteria set by the sender. Where the condition set by the sender has been satisfied, condition status column 1316 of FIG. 13 may store the date and time information of when the condition was satisfied. Also, if notification column 1314 is set to "Yes", then receiving device 102 may transmit information the date and time information stored in condition status column 1316 to transmitting device 101 upon satisfaction of the condition.

Figure 14:
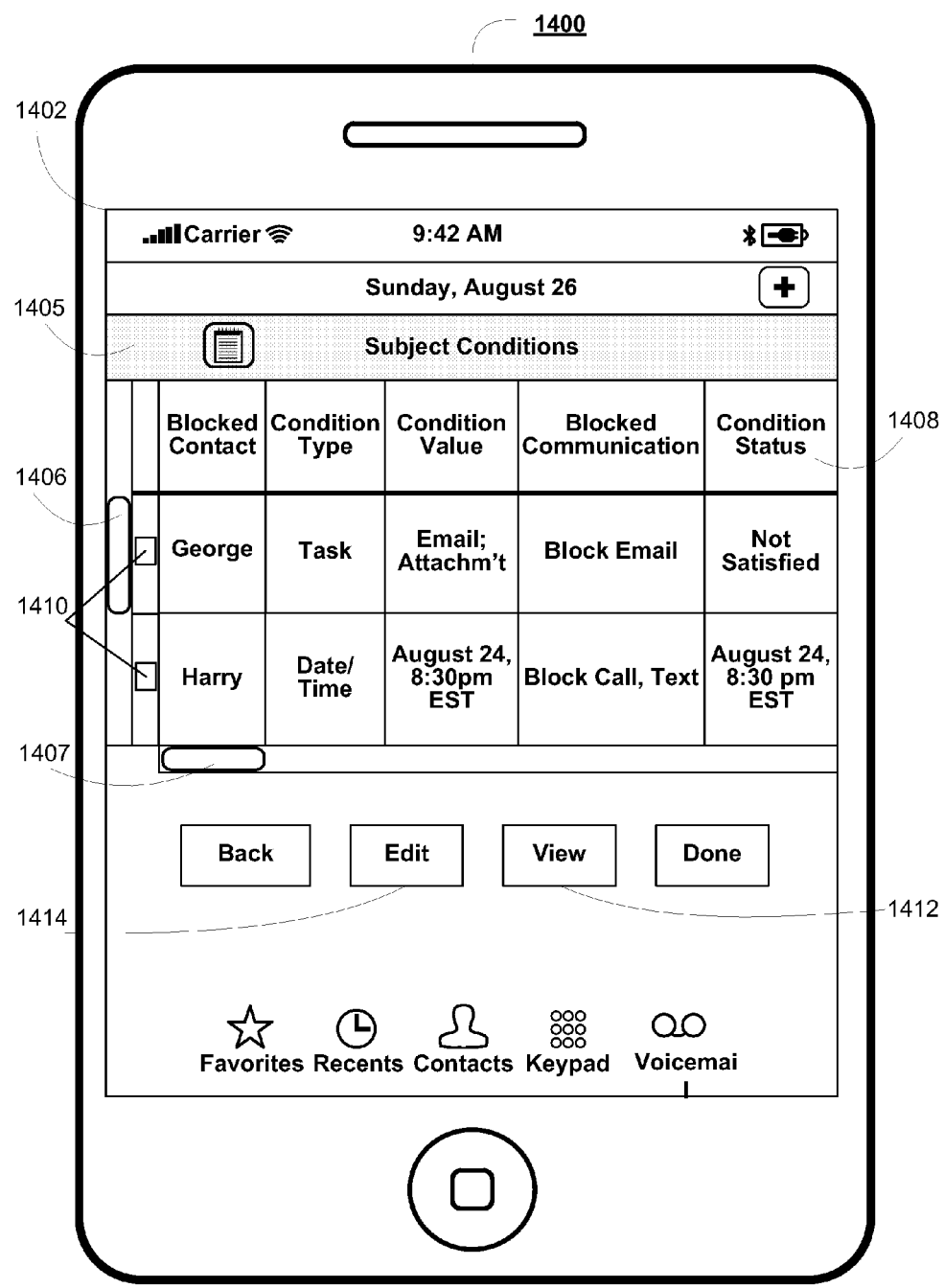
FIGS. 14-16 are illustrative schematic views of the display of a receiving device in accordance with various embodiments of the present invention.

A portion or all of the information stored in data structure 1300 may be displayed on receiving device 102. FIG. 14 shows a receiving device 1400 with a display screen 1402, which displays a summary 1405 of the conditional communication information stored in data structure 1300 (FIG. 13). Scroll bars 1406 and 1407 may be used to scroll up and down or side to side in order to view the information included in the summary. Condition status column 1408 may indicate to the recipient whether and when the condition has been satisfied. The data for condition status column 1408 may be obtained from condition status column 1316 (FIG. 13). The recipient may view all details of a row by selecting a select row box 1410, then selecting view box 1412. This operation may direct the recipient to another display screen (not shown) that displays all of the conditional communication settings for the selected row. The recipient may also edit a row with an unsatisfied condition by selecting the appropriate select row box 1410, then selecting edit box 1414.

Figure 15:
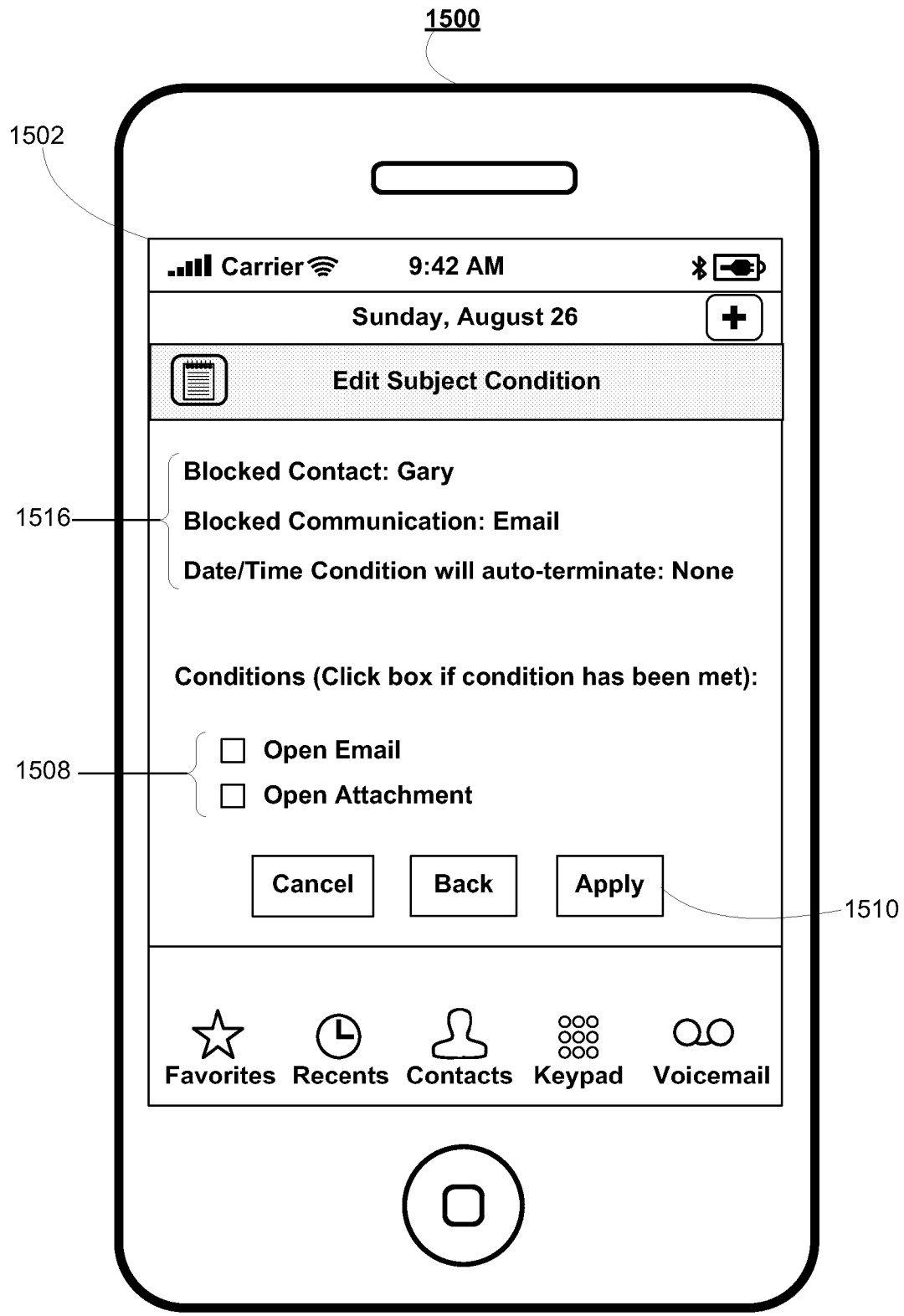

If the recipient chooses to edit row of summary 1405, display screen 1502 of FIG. 15 may be displayed on receiving device 1500. Receiving device 1500 may be the same receiving device as receiving devices 102 and 1400 of FIGS. 1 and 14 respectively. Display screen 1502 may include a condition summary 1506, which uses the data stored in data structure 1300 (FIG. 13) to summarize the conditional communication settings, such as the identity of the blocked contact, the type of communications operation the recipient is prevented from performing to the blocked contact, the date/time the condition will automatically terminate, if applicable, and any other information suitable to inform the recipient of the condition status. Display screen 1502 may also include editable conditions 1508, where the recipient may manually indicate whether or not the set condition has been satisfied. The recipient may edit the status of an editable condition 1508 by selecting the appropriate editable conditions 1508, then selecting apply box 1510. The settings in data structure 1300 (FIG. 13) may be changed to reflect the recipient's edits. If the sender requested to receive notification upon satisfaction of a condition, receiving device 102 may transmit the information in condition status column 1316 (FIG. 13) to transmitting device 101 through communications network 120. In some embodiments, the sender may set a condition so that the recipient will not be given the option to manually edit some or all of the condition settings in this manner.

When a recipient attempts to perform a communications operation, processing circuitry 212 (FIG. 2) of receiving device 102 (FIG. 1) communicates between data structure 1300 (FIG. 13) and communications circuitry 210 (FIG. 2). If the settings indicated in blocked communication column 1308 and blocked contact column 1310 (FIG. 13) match the corresponding settings of the communications operation attempted by the recipient, and if condition status column 1316 (FIG. 13) indicates that the condition has not been satisfied, then processing circuitry 212 may communicate with communications circuitry 210 to prevent the transmission of the recipient's communications operation. Otherwise, the recipient may be permitted to initiate his communications operation.

Figure 16:
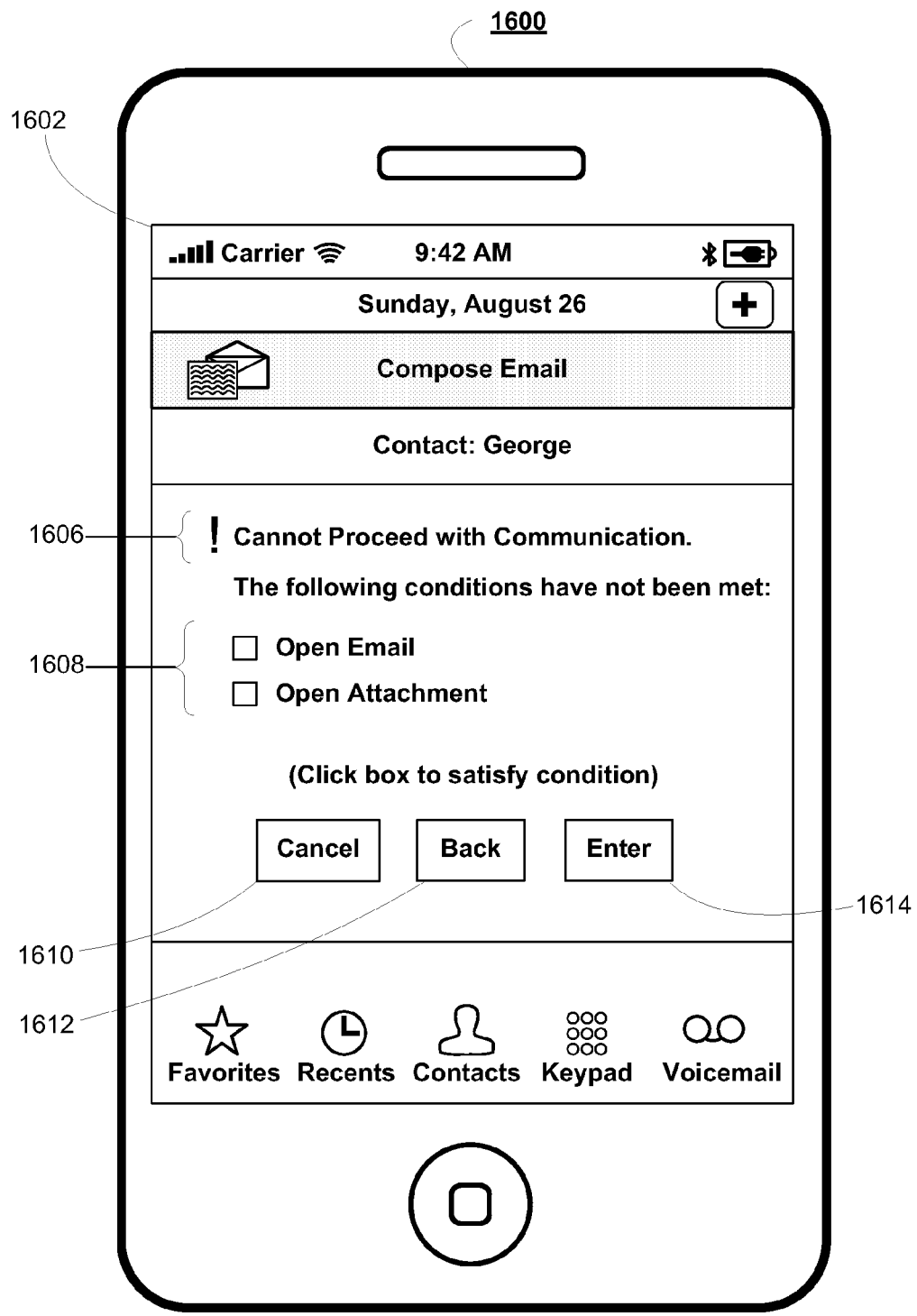

If the recipient attempts to transmit a communications operation where blocked communication column 1308 and blocked contact column 1310 (FIG. 13) match the corresponding settings of the attempted communications operation, and condition status column 1316 (FIG. 13) indicates that the condition has not been satisfied, display screen 1602 of receiving device 1600 of FIG. 16 may be displayed. Receiving device 1600 may be the same receiving device as receiving devices 102, 1400 and 1500 of FIGS. 1, 14 and 15 respectively. Display screen 1602 may include notification 1606, indicating to the recipient that his communications operation cannot be performed because a condition has not yet been satisfied. Unsatisfied conditions 1608, which lists all of the conditions that must be satisfied in order for the recipient to proceed with the communications operation, may also be displayed. The recipient may select an unsatisfied condition 1608 and select enter button 1614 to satisfy the condition (e.g., open the email or attachment, play back the voicemail, get directions to go to a location).

In some embodiments, the recipient may be given the option to manually indicate whether the condition has been satisfied (e.g., for emergencies or exceptional situations). The recipient may select the unsatisfied condition 1608 he wishes to change, then select enter button 1614. If the recipient indicates that all unsatisfied conditions 1608 have been satisfied, then processing circuitry 212 (FIG. 2) may allow the recipient to proceed with his previously blocked communications operation. In some embodiments, the receiving device 1600 may provide an indication to the user who set the condition that the recipient manually overruled the condition. If the recipient does not wish to change the status of any of the unsatisfied conditions 1608, he may select cancel box 1610 or back box 1612.

Figure 17:
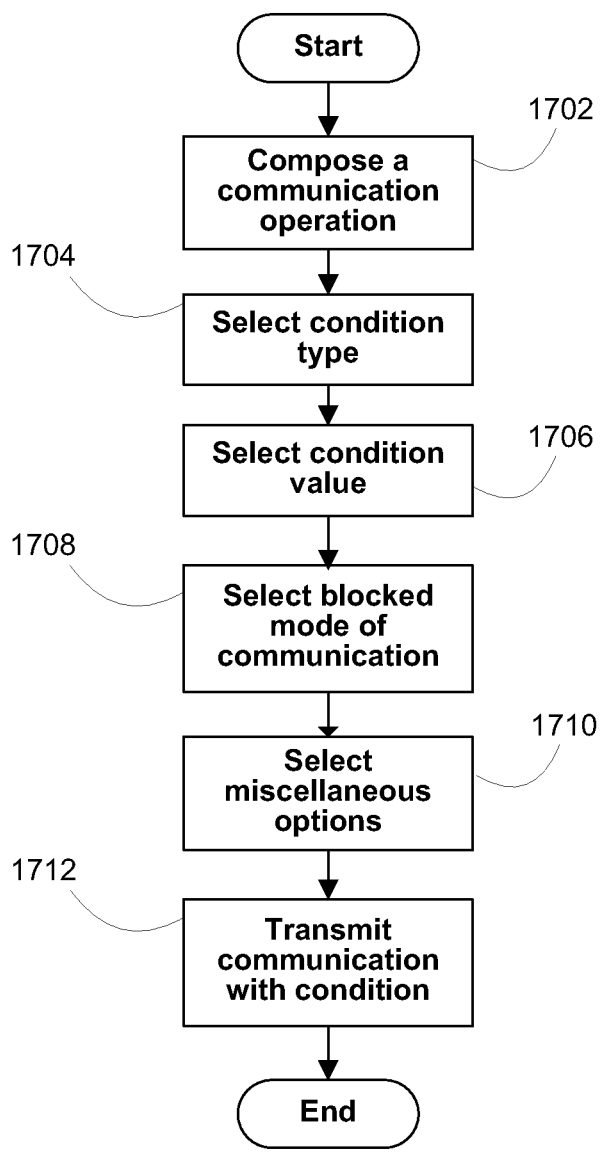
FIG. 17 is a flowchart of an illustrative process of a sender setting a number of conditional communication settings in a transmitting device, in accordance with one embodiment of the present invention.

FIG. 17 is a flowchart of an illustrative process for setting a condition on a recipient of a communications operation by a sender, in accordance with one embodiment of the invention. Process 1700 of FIG. 17 begins with a sender composing a communications operation on a transmitting device 101 (FIG. 1) at step 1702. The sender may select a recipient of the communications operation, who may be a target contact or recipient for whom the sender is setting a condition. For example, the sender may be directed to a display screen such as display screen 302 (FIG. 3), which includes a recipient field 306. The sender may input a recipient into recipient field 306, who may be a target contact for whom the sender is setting a condition. The sender may be given the option to set a condition on a recipient of the communications operation. For example, set condition option 312 of FIG. 3 may be displayed to give the sender the option of setting a condition. If the sender desires to set a condition, he may select set condition option 312.

After the sender selects set condition option 312, the sender may then select a condition type in step 1704. The condition type may be based on a task to be performed by the recipient, the expiration of a date and/or time, a location to be reached by the recipient, a task to be performed by a third party, or any other criteria that may be appropriate. The sender may select the condition type from a display screen such as display screen 402 of (FIG. 4) selecting one of options 406, 408, 410, 412, or 414.

After the sender selects the condition type at step 1704, the sender may then select a condition value at step 1706, the condition value being in accordance with the condition type. If the sender selected a condition type based on a task to be performed by the recipient, then the sender may select a condition value such as open email, open attachment, open most recent email in an email strong, check voicemail, communicate with a third party, complete task list, or any other appropriate task to be performed by the recipient. The sender may select a condition value based on a task to be performed by the recipient from a display screen such as display screen 502 (FIG. 5) by selecting one of options 508, 510, 512, 514, 516 or 518.

With continuing reference to step 1706, if the sender selected a condition type based on the expiration of a date and/or time, then the sender may select a date and/or time for a condition value. For example, the sender may be directed to a display screen such as display screen 702 (FIG. 7), which includes calendar 706 and clock 708. The sender select the appropriate date value on calendar 706 and time value on clock 708 to be set as the condition value in step 1706.

If the sender selected a condition type based on the recipient's and receiving device's 102 arrival at a physical or geographic location, then the sender may set a zone for a condition value. For example, the sender may be directed to a display screen such as display screen 802 (FIG. 8), where the sender may select the appropriate zone from preprogrammed zones option 806 or find other zones option 808 to be set as the condition value in step 1706.

If the sender selected a condition type based on the performance of a task by a third party, then the sender may select a third party to perform a task and a task to be performed by the third party as condition values. For example, the sender may be directed to a display screen such as display screen 902 (FIG. 9), where the sender may input the appropriate third party into contact to perform operation option 906 as a condition value in step 1706. The sender may also select the appropriate task to be performed by the third party from operation to be performed option 908 as a condition value.

If the sender selected a condition type based on other criteria, then the sender may manually input a description of the criteria as a condition value. For example, the sender may be directed to a display screen such as display screen 1002 (FIG. 10), where the sender may manually input a description of the criteria to be satisfied as a condition value in step 1706.

In step 1708, the sender may select a mode of communication (e.g., audio, video or data communication) from which the recipient may be restricted from transmitting to a blocked contact until the condition value selected in step 1706 is satisfied. For any of the condition types that the sender selects in step 1704, a list of options of blocked communications may be displayed to the sender. For example, options of blocked communications 520 (FIG. 5) may be displayed on a display screen 502. The sender may select one of the options of blocked communications 520 (e.g., block call option 522, block email option 524, block text option 526, or block instant message option 528).

In step 1710, the sender may select any remaining miscellaneous options to customize the conditional communication settings. For instance, the sender may make the condition value selected in step 1706 and the blocked mode of communication selected in step 1708 the default setting for the recipient by, for example, selecting "Yes" for make condition default option 530 (FIG. 5). Another miscellaneous option that the sender may select is to receive a notification on transmitting device 101 when the condition value selected in step 1706 has been satisfied. The sender may request such a notification by, for example, selecting "Yes" for notify upon completion of task option 532 (FIG. 5). Another miscellaneous option that the sender may set is a termination date/time for a condition. The sender may set a termination date/time for a condition by, for example, inputting a date/time into termination date/time for condition option 534 (FIG. 5). In some embodiments, where the sender selected to set a condition based on expiration of a date/time as a condition type in step 1704, the sender may be offered a miscellaneous option to automatically delete the communication at the date/time set as the condition value in step 1706. The sender may select to apply this option by, for example, selecting "Yes" for auto-delete communication at set date/time option 734 (FIG. 7).

At step 1712, after the sender has finished selecting all of the desired settings in steps 1704, 1706, 1708, and 1710, the sender may transmit the communication with the selected conditional communication settings. At step 1712, the transmitting device 101 transmits the communication and the selected condition communication settings to communications network 120, which in turn transmits the communication and the selected conditional communication settings to receiving device 102 (FIG. 1).

Figure 18:
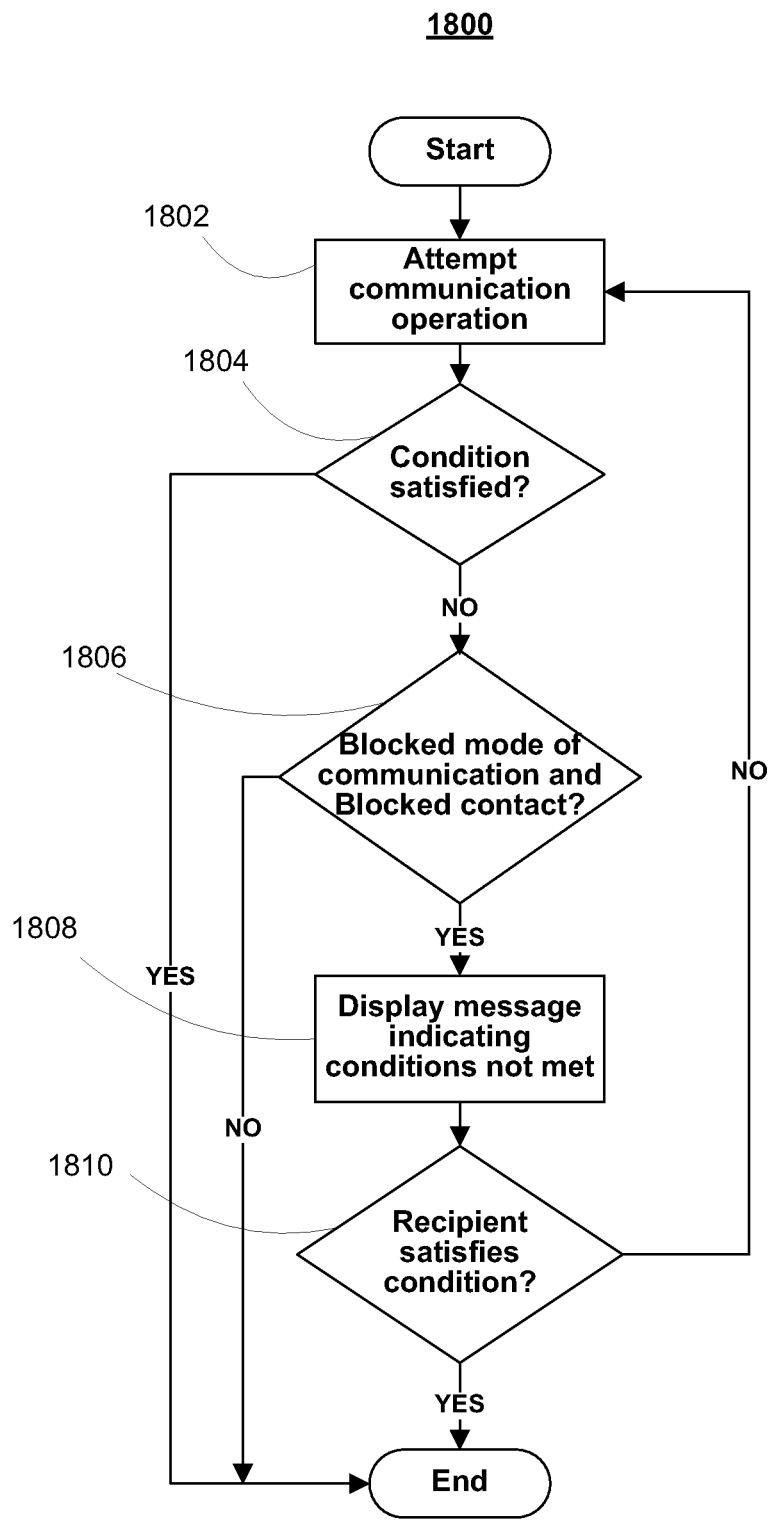
FIG. 18 is a flowchart of an illustrative process for restricting a recipient of a communication with conditional communication settings, where the recipient is prevented from performing a reply communications operation until the conditional communication settings have been satisfied, in accordance with one embodiment of the present invention.

FIG. 18 is a flowchart in accordance with one embodiment of the invention of an illustrative process of a recipient attempting to perform a communications operation from receiving device 102, where the recipient may have a condition set upon him by a sender. Process 1800 of FIG. 18 begins at step 1802, where a recipient attempts to perform a communications operation (e.g., audio, video, or data communication). At step 1804, processing circuitry 212 may communicate with data structure 1300 (FIG. 13) stored in memory 208 (FIG. 2) to detect whether there exists an unsatisfied condition in condition status column 1316 (FIG. 13). If all conditions have been satisfied, then the recipient may be permitted to complete the transmission of his communication. If a condition in condition status column 1316 has not been satisfied, then, at step 1806, processing circuitry 212 may communicate between communications circuitry 210 and data structure 1300 stored in memory 208 to compare the modes of communication and the contacts to receive the recipient's communication for a row with an unsatisfied condition. If the recipient's mode of communication does not match the data value stored in blocked communication column 1308, or if the contact intended to receive the recipient's communication does not match the data value stored in blocked contact column 1310, or both, then the recipient may be permitted to complete the transmission of his communication. However, if there is a match between both the recipient's mode of communication with the data value stored in blocked communication column 1308, and between the contact intended to receive the recipient's communication with the data value stored in blocked contact column 1310, then the recipient may receive a display message at step 1808, such as that shown on display screen 1602 (FIG. 16). Display screen 1602 includes notification 1606 indicating that the recipient's communications operation cannot proceed because one or more conditions have not been satisfied. Unsatisfied conditions 1608 may also be displayed.

In some embodiments, if data structure 1300 (FIG. 13) is stored in the memory of a remote server within communications network 110 (FIG. 1), then at step 1804, processing circuitry located within the remote server, which may be similar to processing circuitry 212 except that it is located in the remote server instead of receiving device 102, may communicate with data structure 1300 (FIG. 13) to detect whether there exists an unsatisfied condition in condition status column 1316 (FIG. 13). If all conditions have been satisfied, then the server's processing circuitry may communicate with communications circuitry 210 (FIG. 2) within receiving device 102 (FIG. 1) to permit transmission of the recipient's communication. If a condition in condition status column 1316 has not been satisfied, then, at step 1806, processing circuitry located within the remote server may communicate between communications circuitry 210 (FIG. 2) within receiving device 102 (FIG. 1) and data structure 1300 stored in a memory within the remote server to compare the modes of communication and the contacts to receive the recipient's communication for a row with an unsatisfied condition. If the recipient's mode of communication does not match the data value stored in blocked communication column 1308, or if the contact intended to receive the recipient's communication does not match the data value stored in blocked contact column 1310, or both, then the server's processing circuitry may communicate with communications circuitry 210 (FIG. 2) within receiving device 102 (FIG. 1) to permit transmission of the recipient's communication. However, if there is a match between both the recipient's mode of communication with the data value stored in blocked communication column 1308, and between the contact intended to receive the recipient's communication with the data value stored in blocked contact column 1310, then the server's processing circuitry may communicate with communications circuitry 210 (FIG. 2) within receiving device 102 (FIG. 1) to prevent transmission of the recipient's communication. The recipient may then receive a display message at step 1808, such as that shown on display screen 1602 (FIG. 16).

If there is a condition that has not been satisfied, the recipient may proceed to step 1810, where the recipient (or third party, if necessary) can perform the action required to satisfy the condition. Once all unsatisfied conditions 1608 have been satisfied, then the recipient will be permitted to complete his communication operation without further restriction. In some embodiments, the recipient may manually indicate that the condition has been satisfied. For example, in FIG. 16, the recipient may select any of unsatisfied conditions 1608 to indicate that such conditions have been satisfied. If the recipient does not indicate that all unsatisfied conditions 1608 have been satisfied, then the recipient will be prevented from transmitting his communication. But if the recipient indicates that all unsatisfied conditions 1608 have been met, then the recipient will be permitted to complete his communication operation without further restriction.

Various configurations described herein may be combined without departing from the present invention. The above described embodiments of the present invention are presented for purposes of illustration and not of limitation. The present invention also can take many forms other than those explicitly described herein. Accordingly, it is emphasized that the invention is not limited to the explicitly disclosed methods, systems and apparatuses, but is intended to include variations to and modifications thereof which are within the spirit of the following claims.

What is claimed is:

1. A method comprising:
  generating, using a first communications device, a conditional communication corresponding to a first mode of communication, wherein generating comprises:
    defining at least one condition for the conditional communication;
    defining at least one recipient of the conditional communication; and
    defining a second mode of communication different from the first mode of communication, wherein access to the second mode of communication is restricted until the at least one condition has been satisfied; and
  transmitting the conditional communication using the first mode of communication.

2. The method of claim 1, further comprising:
  receiving the conditional communication in a second communications device; and
  preventing the second communications device from performing a communications operation using the second mode of communication until the at least one condition has been satisfied.

3. The method of claim 2, wherein generating further comprises:
  defining at least one blocked contact.

4. The method of claim 3, wherein preventing further comprises preventing the second communications device from performing a communications operation with the at least one blocked contact using the second mode of communication are restricted.

5. The method of claim 1, wherein the at least one condition comprises at least one of:
  opening an email communication;
  opening an attachment to an email communication;
  opening a most recent email communication in an email string;
  checking a voice message;
  performing a communication with a third party;
  completing a task list;
  a date occurring;
  a time occurring;
  arriving at a geographic location; and
  detecting that a third party performed an operation.

6. The method of claim 5, wherein detecting that a third party performed an operation comprises detecting that the third party performed at least one of:
  an audio communication;
  a video communication;
  an email communication;
  a telephone communication;
  a text message communication; and
  an instant message communication.

7. The method of claim 1, wherein the first mode of communication and the second mode of communication comprises at least one of:
  email communication;
  telephone communication;
  text message communication; and
  instant message communication.

8. The method of claim 1, wherein generating further comprises:
  defining at least one event upon which the at least one condition is operative to expire.

9. The method of claim 8, wherein the at least one event upon which the at least one condition is operative to expire comprises at least one of:
  a date occurring;
  a time occurring;
  arriving at a geographic location; and
  receiving a communication from a third party communications device.

10. A method of communicating, which includes transmitting a conditional communication from a first device to a second device, the conditional communication comprising a condition and a blocked mode of communication, the method comprising:
  receiving the conditional communication with the second communications device over a first mode of communication;
  determining whether the condition has been satisfied; and
  preventing the second communications device from performing a communications operation over the blocked mode of communication if it is determined that the condition has not been satisfied.

11. The method of claim 10, further comprising:
permitting the second communications device to perform a communications operation over the blocked mode of communication if it is determined that the condition has been satisfied.

12. The method of claim 10, further comprising:
determining that the condition has not been satisfied;
receiving an instruction to ignore the condition; and
permitting the communications device to perform a communications operation over the blocked mode of communication in response to receiving an instruction to ignore the condition.

13. The method of claim 12, further comprising:
informing the first communications device that an instruction to ignore the condition was received.

14. A method for transmitting a conditional communication as part of a first communications operation using a first communications device, the method comprising:
generating the conditional communication using the first communications device, generating comprising:
defining at least one condition type;
defining at least one condition value associated with the defined condition type;
defining at least one recipient of the first communications operation;
defining at least one blocked mode of communication for the conditional communication; and
defining at least one blocked contact;
storing the defined condition type, condition value, recipient, blocked operation of the mode of communication and blocked contact in memory;
initiating the first communications operation using a mode of communication different from the blocked mode of communication; and
transmitting the conditional communication as part of the first communications operation, wherein a recipient device of the conditional communication is prevented from performing a communications operation with the blocked contact using the blocked mode of communication until the condition value is satisfied.

15. The method of claim 14, further comprising:
receiving the conditional communication in a second communications device that is operative to extract the condition type and condition value; and
determining whether the condition value has been satisfied.

16. The method of claim 14, wherein generating the conditional communication further comprises:
defining at least one event upon which the condition is operative to expire.

17. A communications device with a restricted communications operation, the communications device comprising processing circuitry, memory and communications circuitry, the processing circuitry operative to:
direct the communications circuitry to receive a conditional communication using a first mode of communication, the conditional communication comprising:
a condition value;
a blocked mode of communication different from the first mode of communication; and
a blocked contact;
store the received condition value, blocked mode of communication, and blocked contact in memory;
receive a request to perform a communications operation;
determine whether the requested communications operation is with the blocked contact using the blocked mode of communication;
determine whether the stored condition value has been satisfied;
prevent the communications circuitry from performing the requested communications operation in response to determining that the condition value has not been satisfied and that the requested communications operation is with the blocked contact using the blocked mode of communication.

18. The communications device of claim 17, wherein the processing circuitry is further operative to:
permit the communications device to perform the requested communications operation in response to at least one of:
determining that the condition value has been satisfied;
determining that the requested communications operation is not with the blocked contact; and
determining that the requested communications operation is not with the blocked mode of communication.

19. The communications device of claim 17, wherein the processing circuitry is further operative to:
determine whether the conditional communication has expired; and
permit the communications circuitry to perform a communications operation with the blocked contact using the blocked mode of communication in response to determining that the conditional communication has expired.

20. A server comprising memory and processing circuitry, the processing circuitry operative to:
store in memory a condition and a blocked mode of communication associated with a first communications device;
receive a request from the first communications device to perform a communications operation;
determine whether the condition has been satisfied;
determine whether the requested communications operation is with the blocked contact using the blocked mode of communication; and
prevent the first communications device from performing the requested communications operation in response to determining that the condition has not been satisfied and that the requested communications operation is with the blocked contact using the blocked mode of communication.

21. The server of claim 20, wherein the processing circuitry is further operative to:
permit the first communications device to perform the requested communications operation in response to at least one of:
determining that the condition has been satisfied;
determining that the requested communications operation is not with the blocked contact; and
determining that the requested communications operation is using the blocked mode of communication.

22. The server of claim 20, wherein the processing circuitry is further operative to:
determine that the condition has not been satisfied;
receive an instruction to ignore the condition; and
permit the first communications device to perform a communications operation with the blocked contact using the blocked mode of communication in response to receiving the instruction to ignore the condition.

* * * * *